United States Patent
Levesque et al.

(10) Patent No.: US 10,031,583 B2
(45) Date of Patent: Jul. 24, 2018

(54) SYSTEMS AND METHODS FOR FORCE-BASED OBJECT MANIPULATION AND HAPTIC SENSATIONS

(71) Applicant: Immersion Corporation, San Jose, CA (US)

(72) Inventors: Vincent Levesque, Montreal (CA); Juan Manuel Cruz-Hernandez, Montreal (CA); Danny Grant, Laval (CA); Jamal Saboune, Montreal (CA); Liwen Wu, Verdun (CA); Kurt Eerik Stahlberg, Montreal (CA); Abdelwahab Hamam, Montreal (CA)

(73) Assignee: Immersion Corporation, San Jose, CA (US)

( * ) Notice: Subject to any disclaimer, the term of this patent is extended or adjusted under 35 U.S.C. 154(b) by 147 days.

(21) Appl. No.: 14/663,406

(22) Filed: Mar. 19, 2015

(65) Prior Publication Data
US 2015/0268725 A1   Sep. 24, 2015

Related U.S. Application Data

(60) Provisional application No. 61/968,913, filed on Mar. 21, 2014.

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01); *G06F 2203/04105* (2013.01)

(58) Field of Classification Search
CPC ................ G06F 3/1626; G06F 3/0412; G06F 2203/013; G06F 1/1637; G06F 1/1626;
(Continued)

(56) References Cited

U.S. PATENT DOCUMENTS

| 5,784,052 A | 7/1998 | Keyson |
| 7,336,260 B2 | 2/2008 | Martin et al. |

(Continued)

FOREIGN PATENT DOCUMENTS

| EP | 0935191 | 8/1999 |
| WO | WO 2013/104919 | 7/2013 |

OTHER PUBLICATIONS

Buxton et al., Issues and techniques in touch-sensitive tablet input. In Proc. SIGGRAPH 1985, vol. 19, pp. 215-224.
(Continued)

*Primary Examiner* — Hong Zhou
(74) *Attorney, Agent, or Firm* — Kilpatrick Townsend & Stockton LLP

(57) ABSTRACT

Systems and methods for force-based object manipulation and haptic sensations are disclosed. One disclosed method includes the steps of receiving a first signal indicating a location of a user interaction and receiving a second signal indicating a first force. The method also includes, if the location of the user interaction corresponds to an object displayed on a display screen: outputting a first haptic signal to a haptic output device to cause a first haptic effect; and outputting a second haptic signal to the haptic output device to cause a second haptic effect if the first force meets or exceeds a first force threshold.

24 Claims, 14 Drawing Sheets

(58) Field of Classification Search
CPC ...... G06F 3/041; G06F 3/044; G06F 3/03547; G06F 3/016; G06F 2203/04105
USPC .................................. 345/173–174; 715/863
See application file for complete search history.

(56) References Cited

U.S. PATENT DOCUMENTS

| | | | |
|---|---|---|---|
| 7,535,454 B2 | 5/2009 | Jasso | |
| 8,164,573 B2 | 4/2012 | DaCosta et al. | |
| 8,328,638 B2 | 12/2012 | Thorner | |
| 8,378,798 B2 | 2/2013 | Bells | |
| 8,547,244 B2 | 10/2013 | Duarte et al. | |
| 8,576,171 B2 | 11/2013 | Grant | |
| 8,754,854 B1* | 6/2014 | Hamburgen | G06F 3/0489 345/168 |
| 2005/0110769 A1 | 5/2005 | DaCosta | |
| 2005/0209741 A1 | 9/2005 | Cunningham | |
| 2007/0229455 A1* | 10/2007 | Martin | G06F 1/1662 345/156 |
| 2009/0058828 A1* | 3/2009 | Jiang | G06F 3/0488 345/173 |
| 2009/0140989 A1 | 6/2009 | Ahlgren | |
| 2010/0017710 A1* | 1/2010 | Kim | G06F 3/0414 715/702 |
| 2010/0231541 A1* | 9/2010 | Cruz-Hernandez | G06F 3/0488 345/173 |
| 2010/0231550 A1* | 9/2010 | Cruz-Hernandez | G06F 3/016 345/174 |
| 2011/0018695 A1* | 1/2011 | Bells | G06F 3/016 340/407.2 |
| 2011/0248930 A1* | 10/2011 | Kwok | G06F 3/016 345/173 |
| 2011/0267294 A1 | 11/2011 | Kildal | |
| 2012/0146955 A1* | 6/2012 | Martin-Cocher | G06F 3/0236 345/176 |
| 2012/0147052 A1* | 6/2012 | Homma | G06F 3/044 345/660 |
| 2012/0315882 A1* | 12/2012 | Chang | H04M 1/72522 455/414.1 |
| 2013/0113715 A1 | 5/2013 | Grant et al. | |
| 2013/0127735 A1* | 5/2013 | Motoyama | G06F 3/04886 345/173 |
| 2013/0172052 A1 | 7/2013 | Bengtsson | |
| 2013/0321317 A1* | 12/2013 | Hirukawa | G06F 3/016 345/173 |
| 2014/0049483 A1 | 2/2014 | Kim | |
| 2014/0139450 A1 | 5/2014 | Levesque et al. | |
| 2014/0139471 A1 | 5/2014 | Matsuki | |
| 2014/0362014 A1 | 12/2014 | Ullrich et al. | |
| 2015/0097786 A1* | 4/2015 | Behles | G06F 3/041 345/173 |

OTHER PUBLICATIONS

Cechanowicz et al., Augmenting the mouse with pressure sensitive input. In Proceedings of the SIGCHI Conference on Human Factors in Computing Systems—CHI 2007.

Clarkson et al., Exploring Continuous Pressure Input for Mobile Phones. Georgia Institute of Technology, web page available at https://smartech.gatech.edu/handle/1853/13138, as available via the Internet, submitted for review to UIST 2005.

Heo et al., ForceDrag; Using pressure as a touch input modifier, In Proceedings of the 24th Australian Computer-Human Interaction Conference on—OZCHI 2012, pp. 204-207.

Heo et al., Force Gestures: Augmented touch screen gestures using normal and tangential force. In In Proceedings of the 2011 Annual Conference Extended Abstracts on Human Factors in Computing Systems—CHI EA'11, pp. 1909-1914.

Mandalapu et al., Exploring pressure as an alternative to multi-touch based interaction. In Proceedings of the 3rd International Conference on Human Computer Interaction—IndiaHCI 2011.

Miyaki et al., GraspZoom: Zooming and scrolling control model for single-handed mobile interaction, In Proceedings of the 11th International Conference on Human-Computer Interaction with Mobile Devices and Services—MobileHCI 2009.

Mackenzie et al., A Comparison of Three Selection Techniques for Touchpads, CHI '98 Proceedings of the SIGCHI Conference on Human Factors in Computing Systems, pp. 336-343, 1998.

Raisamo, R., Evaluating different touched-based interaction techniques in a public information kiosk. In Conference of the CHI Special Interest Group of the Ergonomics Society of Australia, pp. 169-171, 1999.

Ramos et al., Fluid interaction techniques for the control and annotation of digital video. In Proceedings of the 16th Annual ACM Symposium on User Interface Software and Technology—UIST 2003, vol. 5, pp. 105-114.

Ramos et al., Pressure widgets. In Proceedings of the 2004 Conference on Human Factors in Computing Systems—CHI 2004, vol. 6, No. 1, pp. 487-494.

Ramos et al., Pressure marks. In Proceedings of the SIGCHI Conference on Human Factors in Computing Systems—CHI 2007, p. 1375-1384.

Rekimoto et al., PreSenseII: Bi-direcetional touch and pressure sensing interactions with tactile feedback. In CHI 2006 Extended Abstracts on Human Factors in Computing Systems—CHI EA '06.

Shi et al., PressureFish; A method to improve control of discrete pressure-based input, In Proceeding of the Twenty-Sixth Annual CHI Conference on Human Factors in Computing Systems—CHI 2008, p. 1295-1298.

Stewart et al., Characteristics of pressure-based input for mobile devices. In Proceedings of the 28th International Conference on Human Factors in Computing Systems—CHI 2010.

Voelker et al., An evaluation of state switching methods for indirect touch systems, In Proceedings of the SIGCHI Conference on Human Factors in Computing Systems—CHI 2013, pp. 745-754.

Patent Cooperation Treaty, International Search Report and Written Opinion, International Application No. PCT/US2015/021405 dated Jun. 3, 2015.

* cited by examiner

SYSTEMS AND METHODS FOR FORCE-BASED OBJECT MANIPULATION AND HAPTIC SENSATIONS

REFERENCE TO RELATED APPLICATIONS

This application claims priority to U.S. Provisional Patent Application No. 61/968,913, entitled "Systems and Methods for Force-Based Object Manipulation and Haptic Sensations," filed Mar. 21, 2014, the entirety of which is hereby incorporated by reference herein.

FIELD

The present disclosure generally relates to force-based haptic methods and devices, and more specifically relates to systems and methods for force-based object manipulation and haptic sensations.

BACKGROUND

Many modern processor-based devices are equipped with touch-sensitive input devices, such as touch screens, and some may also be capable of outputting haptic effects. Such devices allow a user to interact with graphically-displayed objects, such as icons or widgets to perform certain functions or to launch one or more applications. When a user interacts with the touch screen to perform these tasks, the device may output a haptic effect when the user touches such an icon or widget to indicate that the user has activated that object.

SUMMARY

Systems and methods for force-based object manipulation and haptic sensations are disclosed. For example, one disclosed method comprises receiving a first signal indicating a location of a user interaction; and receiving a second signal indicating a first force. The method also comprises, if the location of the user interaction corresponds to an object displayed on a display screen: outputting a first haptic signal to a haptic output device to cause a first haptic effect; and outputting a second haptic signal to the haptic output device to cause a second haptic effect if the first force meets or exceeds a first force threshold. In some examples a computer-readable medium may be encoded with program code to cause a processor to perform such a method.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more examples and, together with the description of examples, serve to explain the principles and implementations of systems and methods for force-based object manipulation and haptic sensations.

DETAILED DESCRIPTION

Examples are described herein in the context of systems and methods for force-based object manipulation and haptic sensations. Those of ordinary skill in the art will realize that the following description is illustrative only and is not intended to be in any way limiting. Other examples will readily suggest themselves to such skilled persons having the benefit of this disclosure. Reference will now be made in detail to implementations of examples as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Figure 1A:
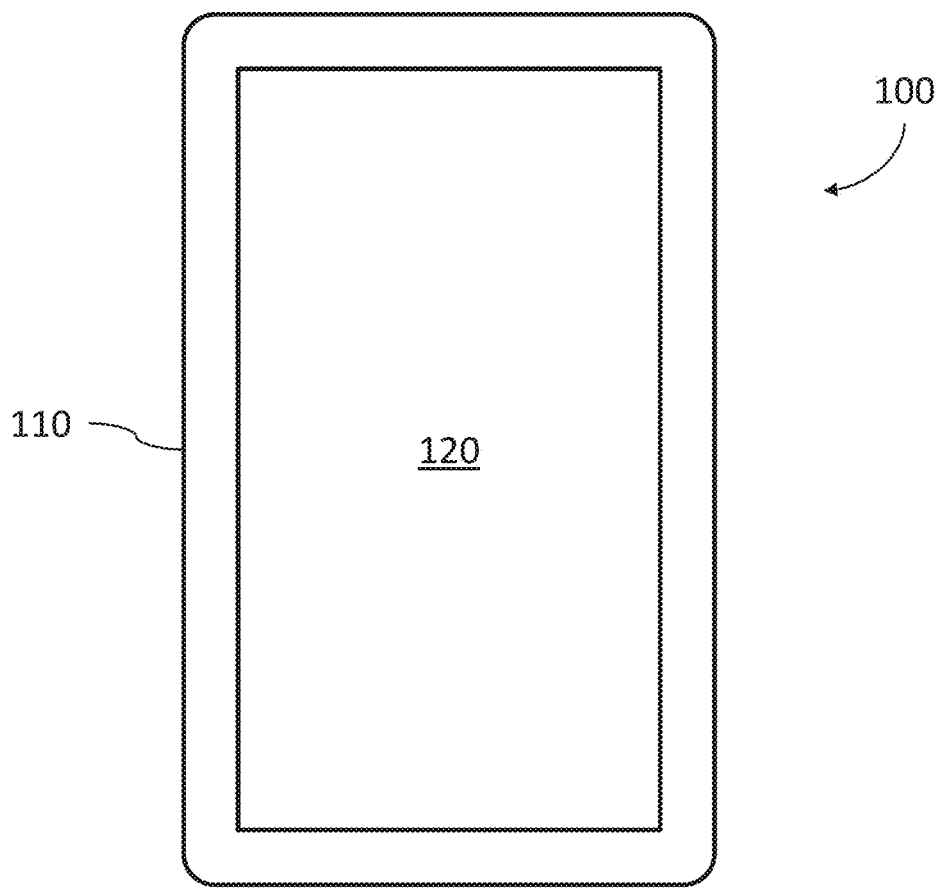
FIGS. 1A-B show systems for force-based object manipulation and haptic sensations according to examples of the present disclosure.

Illustrative System for Force-Based Object Manipulation and Haptic Sensations FIG. 1A shows an illustrative system for force-based object manipulation and haptic sensations. In the example shown in FIG. 1A, the system includes a tablet computer 100 that has a touch-sensitive display 120 (also referred to as a "touch screen") in a housing 110 and a haptic output device (not shown) that is capable of simulating textures when a user contacts the touch-sensitive display 120. In addition, the tablet 100 includes another haptic output device (not shown) that is capable of outputting vibrational effects to the touch-sensitive display 120. The tablet 100 provides a graphical user interface (GUI) to allow the user to interact with the tablet 100, such as by launching applications, manipulating objects or images displayed on the screen, or otherwise performing various tasks. In this example, since the tablet 100 is enabled with the touch-sensitive display 120, the user may elect to touch the touch-sensitive display 120 to select icons, perform gestures to provide inputs to the GUI provided by the tablet's operating system (OS) or by other GUIs available through applications, widgets, or other types of software.

In addition, the tablet 100 is equipped with one or more force sensors that sense the force applied to the touch-sensitive display 120, such as when the user uses her finger to contact the touch-sensitive display 120. In this example, the touch-sensitive display 120 has multi-touch capability. That is, the touch-sensitive display 120 is capable of interpreting multiple simultaneous (or substantially simultaneous) contacts and corresponding forces to allow the user to perform gestures using multiple fingers (or other input devices, such as styluses). As the user touches the touch-sensitive display 120, the touch-sensitive display 120 and force sensors send location and force information to a processor of the tablet 100, which is configured to take certain actions based on the location and force of the user's contact.

For example, the tablet 100 may display arrangements of icons in a GUI that represent different applications or widgets installed on the tablet 100. In some cases, a user may wish to interact with the touch-sensitive display 120 without activating or otherwise interacting with components of the GUI. For example, the tablet 100 is configured to allow a user to lightly contact the touch-sensitive display 120 and receive haptic feedback based on the contact without activating an icon or widget, or otherwise manipulating the GUI. Thus, the user could drag her finger across the touch-sensitive display 120 to feel where different icons or widgets are located, based on various haptic effects, and differentiate between the different icons or widgets based on those haptic effects without needing to look at the touch-sensitive display 120. Such functionality may be particularly advantageous in situations where user attention is focused elsewhere, such as while the user is driving, but attempting to change radio stations or adjust climate control settings. If the user elects to select an icon or widget, or to otherwise manipulate the GUI (e.g. to swipe to another page of icons), the user would press harder on the touch-sensitive display 120 and perform the desired gesture. By increasing the force on the touch-sensitive display 120, the tablet 100 changes from an "exploration" mode, in which the user can explore the screen tactilely, to a "manipulation" mode, in which the user can activate icons or widgets, or otherwise manipulate the GUI. In some examples, the user can return to the exploration mode by reducing the force on the touch-sensitive display 120.

To enable this functionality, the tablet 100 includes software to determine force thresholds, which may be customized by the user or may be automatically tuned over time by the device. Such tuning may occur transparently or interactively, such as by presenting a message to the user—e.g., "launching application . . . did you intend to launch the app?"—and providing the user an option to select either "yes" or "no." Such information may be fed back into an adaptive determination of force thresholds. Thus, by comparing the force of the user's contacts with the force threshold(s), the device can switch between exploration and manipulation modes. In addition, the device may provide other types of feedback to indicate the mode or the change in modes, such as additional haptic effects; visual effects, such as pop-up messages or changes in the display (e.g., by greying out features while in exploration mode); or audible effects, like chimes or chords.

In addition to the exploration and manipulation modes, the tablet 100 also includes a second force threshold, above which manipulations of the GUI change in nature. When the user is pressing particularly hard, to dissuade such an amount of force, the GUI may become less responsive to manipulation. In such a case, icons may move more slowly, as if they are being dragged through a viscous material or are experiencing frictional resistance based on a virtual surface below the icon, or application icons may initially slide out from under the user's finger rather than being easily selectable. In addition, upon the user's contact force meeting or exceeding the second threshold, the tablet 100 may output a haptic effect to the user to indicate that the second force threshold has been reached. Similarly, as the user reduces the force below the second force threshold, another haptic effect may be output to confirm to the user that the force level is appropriate for manipulating the GUI. In some examples discussed in more detail below, a threshold may have two different values, one that is used as force is being increased, and another as the force is being decreased. Or, in some examples, the force must drop below a threshold (including in the case of a hysteretic threshold) for a minimum duration before the mode switches. In other words, some forces may be hysteretic or "sticky." This may provide a more user-friendly interface in cases where the user unintentionally reduces force during a manipulation, as the user will not be frustrated if the mode of interaction unexpectedly changes mid-manipulation.

In addition to the multi-mode force interface discussed above, the tablet 100 also responds to force-based gestures to interact with various user interfaces. For example, the main GUI screen of the tablet 100 may comprise a number of icons representing applications arranged in a tiled format. To view additional screens of the user interface, the user may swipe to the left or right along the touch-sensitive display 120 to reveal other screens with additional applications. However, the user interface also allows the user to increase the force the user applies to the touch-sensitive display 120 to "zoom" into the interface. For example, a user may navigate into a folder shown on the interface by simply pressing harder on the touch-sensitive display 120. As another example, if the user is interacting with a mapping application, the user may increase or reduce the zoom level by increasing or reducing force. In some examples, the user may opt to change the type of information displayed at a particular user interface level. For instance, the user may customize the type of information displayed at a particular zoom level, such as from a road and highway line map to a topographical map, a satellite image, or a street view of the visible portion of the map. Thus, the use of force may enhance the number of degrees of freedom in what otherwise appears to be a two-dimensional interface.

The tablet 100 also employs force sensing to provide more immersive haptic sensations to a user based on her interactions with the device. As discussed above, the main GUI screen of the user interface may include a number of icons arranged in a tiled format. As a user lightly drags her finger over the touch-sensitive display 120, she may feel a haptic effect, such as electrostatic friction effects, as her finger slides across an icon to indicate she is "hovering" over the icon. To obtain more informative haptic sensations, the user may increase the contact force. As the contact force increases, the device provides increasingly detailed haptic sensations, such as a texture effect that relates to the application represented by the icon. For example, if the user begins pressing on an icon for a calendar application, the tablet 100 outputs a haptic texture that feels like a grid, to represent the shape of a monthly calendar. Or if the user begins pressing on an icon to make a phone call, the tablet 100 outputs a texture that corresponds to the shape of a telephone handset, such as by using a haptic output device that deforms the contact surface on the touch-sensitive display 120. In some cases, a vibrational haptic effect may be used. For example, if a user attempts to locate an icon to make an emergency call while the tablet 100 is locked, the tablet 100 outputs a repeated sequence of haptic effects to mimic the Morse code sequence for SOS—i.e., three short vibrations followed by three longer vibrations followed by three short vibrations—to indicate to the user that she has located the correct icon.

Thus, the illustrative device shown in FIG. 1A provides a full-featured force-sensitive haptic user interface to allow the user greater control and sensory feedback during her exploration and manipulation of the user interface. These illustrative examples are given to introduce the reader to the general subject matter discussed herein and the disclosure is not limited to these examples. The following sections describe various additional non-limiting examples of systems and methods for force-based object manipulation and haptic sensations.

Figure 1B:
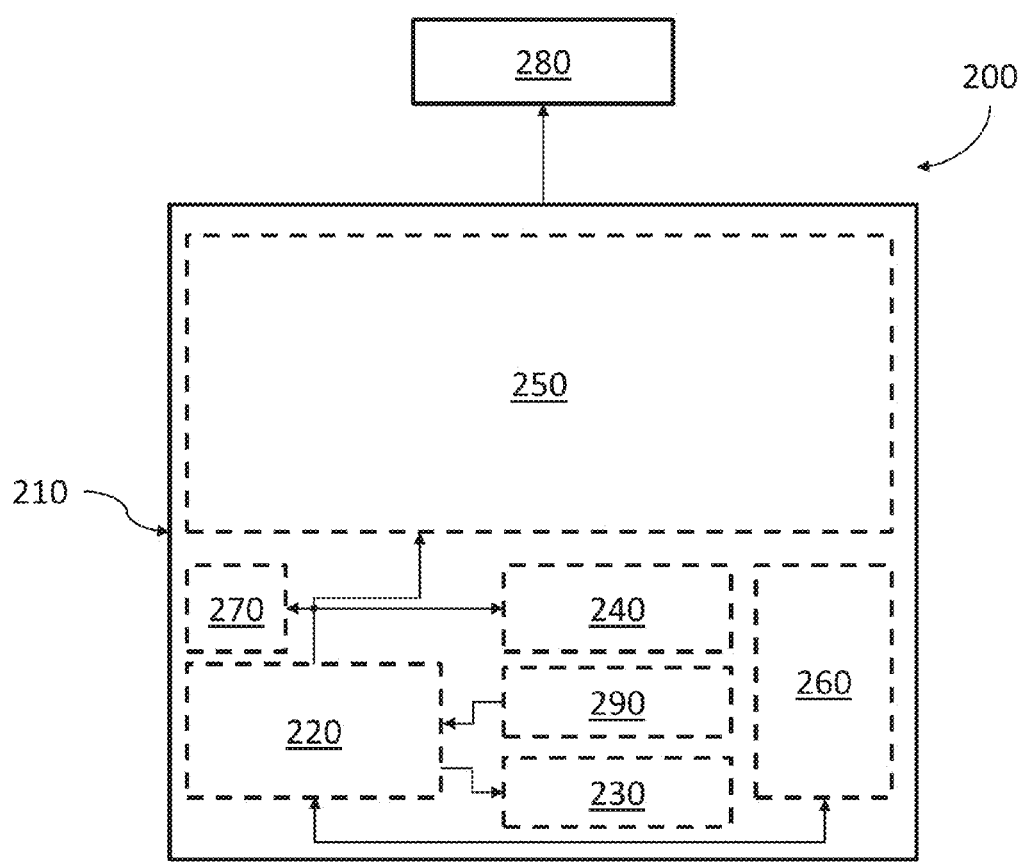

Referring now to FIG. 1B, FIG. 1B shows a system 200 for force-based object manipulation and haptic sensations according to one example of this disclosure. In the example shown in FIG. 1B, the system 200 comprises a housing 210, a processor 220, a memory 230, a touch-sensitive display 250, a haptic output device 240, a communication interface 260, a speaker 270, and a force sensor 290. In addition, the system 200 is in communication with haptic output device 280, which may be optionally coupled to or incorporated into some examples. The processor 220 is in communication with the memory 230 and, in this example, both the processor 220 and the memory 230 are disposed within the housing 210.

The touch-sensitive display 250, which comprises or is in communication with a touch-sensitive surface, is partially disposed within the housing 210 such that at least a portion of the touch-sensitive display 250 is exposed to a user of the system 200. In some examples, the touch-sensitive display 250 may not be disposed within the housing 210. For example, the system 200 may be connected to or otherwise in communication with a touch-sensitive display 250 disposed within a separate housing. In some examples, the housing 210 may comprise two housings that may be slidably coupled to each other, pivotably coupled to each other or releasably coupled to each other. In still other examples, the system 200 may comprise or be in communication with a display and may comprise or be in communication with other user input devices, such as a mouse, a keyboard, buttons, knobs, slider controls, switches, wheels, rollers, joysticks, other manipulanda, or a combination thereof.

In some examples, one or more touch-sensitive surfaces may be included on or disposed within one or more sides of the system 200. For example, a touch-sensitive surface may be disposed within or comprise a rear surface of the system 200. In another example, a first touch-sensitive surface is disposed within or comprises a rear surface of the system 200 and a second touch-sensitive surface is disposed within or comprises a side surface of the system 200. In some examples, the system 200 may comprise two or more housing components, such as in a clamshell arrangement or in a slideable arrangement. For instance, a system 200 may have a clamshell configuration with a touch-sensitive display 120 disposed in each of the portions of the clamshell. Furthermore, in some examples, the touch-sensitive display 250 may not comprise a touch-sensitive surface (e.g., the touch-sensitive display 250 may be a display without touch-input capability). In some examples, one or more touch-sensitive surfaces may be flexible or deformable. In other examples, one or more touch-sensitive surfaces may be rigid. The system 200 may comprise both flexible and rigid touch-sensitive surfaces.

In the example shown in FIG. 1B, the touch-sensitive display 250 is in communication with the processor 220 and is configured to provide signals to the processor 220 or the memory 230 and to receive signals from the processor 220 or memory 230. The memory 230 is configured to store program code, data, or both for use by the processor 220. The processor 220 is configured to execute program code stored in memory 230 and to transmit signals to and receive signals from the touch-sensitive display 250. In the example shown in FIG. 1B, the processor 220 is also in communication with the communication interface 260. The processor 220 is configured to receive signals from the communication interface 260 and to output signals to the communication interface 260 to communicate with other components or devices, such as one or more remote computers or servers.

In addition, the processor 220 is in communication with haptic output device 240 and haptic output device 280, and is further configured to output signals to cause haptic output device 240, haptic output device 280, or both to output one or more haptic effects. Furthermore, the processor 220 is in communication with speaker 270 and is configured to output signals to cause speaker 270 to output sounds. In various examples, the system 200 may comprise or be in communication with fewer or additional components or devices. For example, other user input devices such as a mouse, trackball, trackpad, keyboard, an additional touch-sensitive device, or any combination of these may be comprised within the system 200 or be in communication with the system 200. As another example, system 200 may comprise and/or be in communication with one or more accelerometers, gyroscopes, digital compasses, and/or other sensors.

The housing 210 of the system 200 shown in FIG. 1B provides protection for at least some of the components system 200. For example, the housing 210 may be a plastic casing that protects the processor 220 and memory 230 from foreign articles such as rain. In some examples, the housing 210 protects the components in the housing 210 from damage if the system 200 is dropped by a user. The housing 210 can be made of any suitable material including but not limited to plastics, rubbers, or metals. Various examples may comprise different types of housings or a plurality of housings. For example, in some examples, the system 200 may be a portable device, handheld device, toy, trackball, mouse, trackpad, gaming console, handheld video game system, gamepad, game controller, desktop computer, e-book reader, camera, video camera, portable multifunction device such as a cell phone, smartphone, personal digital assistant (PDA), laptop, tablet computer, digital music player, etc.

In the example shown in FIG. 1B, the haptic output devices 240 and 280 are in communication with the processor 220 and are configured to provide one or more haptic effects. For example, when the processor 220 transmits an actuation signal to haptic output device 240, haptic output device 280, or both, the respective haptic output device(s)

240, 280 outputs a haptic effect based on the actuation signal. In some examples, the processor 220 is configured to transmit a haptic output signal to haptic output device 240 comprising an analog drive signal. In other examples, the processor 220 is configured to transmit a high-level command to haptic output device 280. The command can include a command identifier and zero or more parameters to be used to generate an appropriate drive signal to cause the haptic output device 280 to output the haptic effect. Different signals and different signal types may be sent to each of one or more haptic output devices. For example, a processor may transmit low-level drive signals to drive a haptic output device 240 to output a haptic effect. Such a drive signal may be amplified by an amplifier or may be converted from a digital to an analog signal, or from an analog to a digital signal, using suitable processors or circuitry to accommodate the particular haptic output device 240 being driven.

To generate haptic effects, many devices utilize some type of actuator or haptic output device 240, 280. The haptic output device 240, 280 may include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Haptic output devices also broadly include other devices (e.g., non-mechanical and non-vibratory devices) such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

In some examples, deformation of one or more components can be used to produce a haptic effect. For instance, one or more haptic effects may be output to change the shape of a surface or a coefficient of friction of a surface. In an example, one or more haptic effects are produced by creating electrostatic forces and/or ultrasonic forces that are used to change friction on a surface. In other examples, an array of transparent deforming elements may be used to produce a haptic effect, such as one or more areas comprising a smart gel.

Some examples comprise haptic output devices 240, 280 that are overlaid on the touch-sensitive display 250 or otherwise coupled to the touch-sensitive display 250. The haptic output devices 240, 280 may output frictional or deformation effects to the touch-sensitive surface of the touch-sensitive display 250. In some examples, other portions of the system may provide such forces, such as portions of the housing that may be contacted by the user or in a separate touch-sensitive input device that is coupled to the system 200. Co-pending U.S. patent application Ser. No. 13/092,484, filed Apr. 22, 2011, entitled "Systems and Methods for Providing Haptic Effects," the entirety of which is hereby incorporated by reference, describes ways that one or more haptic effects can be produced and describes various haptic output devices 240, 280.

It will be recognized that any type of input synthesis method may be used to generate the interaction parameter from one or more haptic effect signals including, but not limited to, the method of synthesis examples listed in TABLE 1 below.

TABLE 1

METHODS OF SYNTHESIS

| Synthesis Method | Description |
| --- | --- |
| Additive synthesis | combining inputs, typically of varying amplitudes |
| Subtractive synthesis | filtering of complex signals or multiple signal inputs |
| Frequency modulation synthesis | modulating a carrier wave signal with one or more operators |
| Sampling | using recorded inputs as input sources subject to modification |
| Composite synthesis | using artificial and sampled inputs to establish a resultant "new" input |
| Phase distortion | altering the speed of waveforms stored in wavetables during playback |
| Waveshaping | intentional distortion of a signal to produce a modified result |
| Resynthesis | modification of digitally sampled inputs before playback |
| Granular synthesis | combining of several small input segments into a new input |
| Linear predictive coding | similar technique as used for speech synthesis |
| Direct digital synthesis | computer modification of generated waveforms |
| Wave sequencing | linear combinations of several small segments to create a new input |
| Vector synthesis | technique for fading between any number of different input sources |
| Physical modeling | mathematical equations of the physical characteristics of virtual motion |

In FIG. 1B, the communication interface 260 is in communication with the processor 220 and provides wired or wireless communications from the system 200 to other components or other devices. For instance, the communication interface 260 may provide wireless communications between the system 200 and a communications network. In some examples, the communication interface 260 may provide communications to one or more other devices, such as another system 200 and/or one or more other devices, such as a television, DVR, or other audio-visual component. The communication interface 260 can be any component or collection of components that enables the system 200 to communicate with another component, device, or network. For example, the communication interface 260 may comprise a PCI communication adapter, a USB network adapter, or an Ethernet adapter. The communication interface 260 may communicate using wireless Ethernet, including 802.11 a, g, b, or n standards. In one example, the communication interface 260 can communicate using Radio Frequency (RF), Bluetooth, CDMA, TDMA, FDMA, GSM, Wi-Fi, satellite, or other cellular or wireless technology. In other examples, the communication interface 260 may communicate through a wired connection and may be in communication with one or more networks, such as Ethernet, token ring, USB, FireWire 1394, fiber optic, etc. In some examples, the system 200 comprises a single communication interface 260. In other examples, system 200 comprises two, three, four, or more communication interfaces.

The example shown in FIG. 1B also comprises a force sensor 290, though some examples may comprise no force sensors or a plurality of force sensors. Additionally, the force sensor 290 may be housed in the same component as the other components of the system 200 or in a separate component. For example, the processor 220, memory 230, and force sensor 290 may all be comprised in the housing 210. The force sensor 290 is in communication with the processor 220 and is configured to transmit one or more signals comprising force information to the processor 220. Such force information may include a magnitude, a location, an area, a change in force, a rate of change in force, and other types of force information. In some examples, the force sensor 290 may comprise load cells, force-sensing resistors (FSR), or quantum tunneling composites (QTC), which can, for example, be mounted under a touch-sensitive surface to measure applied pressure or force. The applied pressure or force can also be estimated based on changes in the area of contact or color of the finger pad. For example, the processor 220 can receive a sensor signal from the force sensor 290 indicating an area of contact of a user's finger pad against the touch-sensitive display 250. The processor 220 can estimate the amount of force being applied to the touch-sensitive display 250 based on the area of contact (e.g., a larger contact area may be indicative of higher force).

In some examples, the force sensor 290 is configured to sense forces within a desirable range. For example, a force sensor 290 is configured to continuously sense and measure forces in a range of 1 to 200 grams-force, with 8-bits or more of resolution. In some examples, the force sensor 290 may provide more coarse measurements. For example, one suitable force sensor 290 may be capable of outputting three values: no force applied, low force, and high force.

Still additional types of force sensors 290 may be suitable for use with examples according to this disclosure. For example, a force sensor 290 can include two switches. The first switch can activate upon a user applying a force above a first threshold to the force sensor 290. The second switch can activate upon a user applying a force above a second threshold to the force sensor 290. Each of the switches can transmit signals to the processor 220 when activated. In this manner, the force sensor 290 can detect different amounts of force and transmit associated signals to the processor 220. Force sensor 290 may comprise any number or configuration of switches that actuate in any manner responsive to any number or configuration of force levels.

In some examples, the system 200 may not include a force sensor 290, but may determine a pseudo force. For instance, a touch-sensitive surface may generate a pseudo-force signal based on a contact with the touch-sensitive surface. The pseudo force in one such example may be based on the amount of capacitance resulting from a conductor (e.g., the user's finger) touching the touch-sensitive surface. Accordingly, the amount of capacitance is not a direct measure of force but rather a pseudo force. The pseudo force provided by the touch-sensitive surface may not be a measure of the actual vertical displacement by a conductor at a single point on the touch-sensitive surface, but rather an estimation of the vertical displacement based on the size of the capacitance change. The pseudo force may or may not accurately represent the amount of force actually exerted on the touch-sensitive surface. For example, the larger the surface of the conductor (e.g., a user's finger) used on the touch-sensitive surface, the larger the change in capacitance per amount of force exerted. If a user presses heavily against the touch-sensitive surface with a fleshy part of the finger, the amount of touch-sensitive surface area covered by the finger is greater than then when the same part of the finger is touching lightly. In some examples, the area covered, and the corresponding pseudo force, is also greater than when the user presses heavily with a bony part of a finger.

In some examples, additional sensors (not shown) may be incorporated into the system 200. For example, sensors may be disposed within the housing 210 or in a component separate from another component that houses the memory 230 and/or processor 220. For instance, a wearable sensor may be in communication with the processor 220 and memory 230, a user device, or wearable device via a wired or wireless connection. In some examples, such sensors may be configured to sense an environmental factor, which can represent at least one of an ambient condition or a force applied to the sensor. The additional sensors can comprise any number or type of sensing components. As an example, the sensors may comprise an accelerometer or gyroscope. A non-limiting list of examples of sensors and environmental factors is provided below:

TABLE 1

Example Sensors and Factors

| Sensor | Environmental Factor Sensed |
| --- | --- |
| Accelerometer | Force in one, two, or three directions |
| Altimeter | Altitude |
| Thermometer | Ambient temperature; user body temperature |
| Heart rate monitor | Heart rate of device user |
| Skin resistance monitor | Skin resistance of device user |
| Oxygen sensor | Oxygen use of device user |
| Audio sensor/microphone | Ambient audio and/or audio generated by device user |
| Photosensor | Ambient light |
| IR/Photosensor | User eye movement, position, body temperature |
| Hygrometer | Relative humidity |
| Speedometer | Velocity |
| Pedometer/odometer | Distance traveled |
| chronometer | time of day, date |

Environmental factors can include any of the environmental factors noted above or any other quantities representative of an ambient condition or force applied to or directed to the device of system 200. Additionally, environmental factors may be evaluated directly from sensor data or may be processed by the device to derive other environmental factors. For example, acceleration data may be used to determine a device orientation, velocity and/or a pattern of motion. As a further example, physiological data such as heart rate, skin resistance, and other factors can be used to determine a physiological state of a device user (e.g., awake, stressed, asleep, REM sleep, etc.).

In some examples, the system 200 comprises a mouse, trackball, trackpad, joystick, gamepad, or other user interface device. The processor 220, memory 230, force sensor 290, and/or haptic output devices 240, 280 may be disposed within or coupled to the user interface device. In some examples, the force sensor 290 can be configured to detect an amount of force applied to one or more manipulanda (e.g., trackball, touch-sensitive surface, button, or joystick) of the user interface device and transmit an associated sensor signal to the processor 220.

In some examples, the system 200 is configured to be worn by a user. For example, the system 200 may be embedded in or coupled to a wearable device, such as a wrist watch, other jewelry, gloves, etc. In one examples, the system 200 may comprise one or more force sensors 290 coupled to the fingertips of a glove. The user may wear the glove and interact with a surface, such as a table, wall, or desk. The system 200 may detect, via the force sensors 290, the user interacting with the surface and transmit an associated sensor signal to the processor 220. For example, the system 200 may output a (visible or invisible) virtual object on a display, or project (e.g., via a projector) the virtual object onto a surface. The system 200 may detect the user contacting the display or surface at a particular location and/or with a particular amount of force to interact with the virtual object. Based on the user interaction, the system 200 may manipulate a GUI (output on the display or projected onto the surface), switch between system states or modes, switch between user interface levels, and/or output an associated haptic effect.

For example, as the user presses a finger against a table with different amounts of force, the system 200 may switch between user interface levels, or between an exploration mode and a manipulation mode. As another example, the system 200 may output a haptic effect via haptic output devices 240, 280 based on the user interaction. The haptic output devices 240, 280 may be coupled to the wearable device, the display, the surface, or any combination of these. For example, the wearable device can include haptic output devices 240, 280 coupled to the fingertips of the glove. The wearable device may output haptic effects to the user's fingertips via the haptic output devices 240, 280. As another example, the system 200 may transmit (e.g., wirelessly) haptic signals to a haptic output device 280 coupled to the display or surface, causing the display or surface, respectively, to output the haptic effect (e.g., a vibration).

Figure 2A:
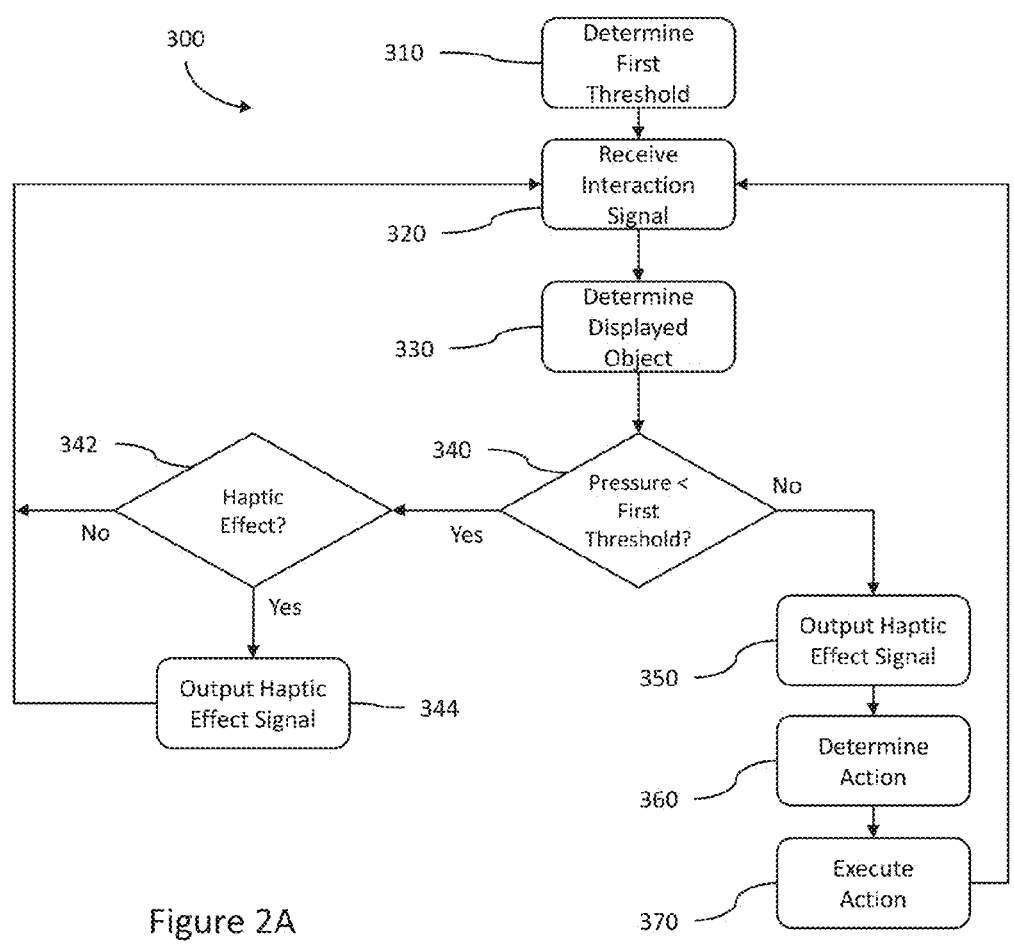
FIGS. 2A-B show methods for force-based object manipulation and haptic sensations according to examples of the present disclosure.

Referring now to FIG. 2A, FIG. 2A shows a method 300 for force-based object manipulation and haptic sensations according to one example of this disclosure. FIG. 2A is described with respect to a software application executed by the system 200 shown in FIG. 1B; however, the methods disclosed herein are not limited to execution by only the device shown in FIG. 1B, but rather may be executed by any suitable system according to this disclosure.

The method 300 begins in block 310 where the system 200 determines a first threshold value. To determine the first threshold, the system 200 may use a default value encoded within the software application, may read the first threshold from a computer-readable medium, such as from a configuration file stored in a hard disk, may receive the first threshold from a remote device over a communications network, or may receive the first threshold from a user preference setting, such as by a user entering a desired threshold. In some examples, the first threshold may be adaptive in that the system 200 uses an initial value for the first threshold and, based on usage patterns, adjusts the first threshold up or down over time. For instance, the system 200 may adjust the first threshold up based on how the user uses the device over time.

In some examples, the system 200 may determine a hysteretic first threshold. For instance, in the example shown in FIG. 4, the first threshold comprises two different force amounts, a low force and a high force. The different forces are used depending on the mode of the system 200. As may be seen in FIG. 4, the system 200 may be in either an exploration mode or a manipulation mode. While the system 200 is in the exploration mode, the first threshold corresponds to the high force value, identified as the "manipulation threshold" in FIG. 4. However, while the system 200 is in the manipulation mode, the first threshold corresponds to the low force value, identified as the "exploration threshold." Such a hysteretic threshold may be used to require a user to apply significant force to transition from the exploration mode to the manipulation mode, but allow the user to reduce the force used to a more comfortable level, without reverting to the exploration mode. In some examples, a hysteretic threshold may comprise a first force value of 50 grams-force and a second force value of 100 grams-force.

In some examples, the first threshold may comprise both a force level and a duration. In such an example, the system 200 will check the user's force level against the force threshold, but the system 200 will only determine that the first threshold has been met or exceeded after the user maintains the force level for the duration required. Similarly, after satisfying the first threshold, the system 200 may also require, before indicating a drop back below the threshold, that the force drop below the first threshold force level for the duration. Such conditions may provide a friendlier user interface that reduces user frustration based on unintentional gestures. Once the first threshold has been determined, the method 300 proceeds to block 320.

In block 320, the system 200 receives one or more signals indicating a user interaction (e.g., contact) with a force-sensitive surface (e.g., a touch-sensitive surface or force-sensitive button), the one or more signals comprising a first force and/or a first location. For example, as a user touches the touch-sensitive display 250, the force-sensitive surface may provide one or more signals indicating a location of the user interaction and an amount of force. In some examples, as discussed above, the system 200 may include a touch-sensitive display 250 that provides a signal indicating a location of a user interaction, and a separate force sensor 290 that provides force information. Thus, multiple signals may be received and used according to some examples of the present disclosure. In some examples, a single signal may include both location information and force information. After the one or more signals are received, the method 300 proceeds to block 330.

In block 330, the system 200 determines whether the user interaction corresponds with an object displayed on a display screen (e.g., touch-sensitive display 250). For instance, the system 200 may determine whether the location of a virtual cursor controllable by the user input device corresponds with an object displayed on the display screen. In some examples, the system 200 may determine whether the user interaction corresponds with the object based on the first location. For example, if the display screen shows a home screen having a plurality of icons and widgets, the processor 220 determines whether the user interaction is at a location corresponding to an icon or widget. In some examples, other objects may be displayed by the system 200. For example, the system 200 may display controls for a user interface system for a car on the display screen, such as the climate control system 402 shown in FIG. 3. In such an example, the system 200 may determine whether the user interaction corresponds to a control displayed on the display screen, such as an "A/C" control or a defroster control. In another example corresponding to a touch-based game, such as the game 404 shown in FIG. 3, the system 200 may determine whether the user interaction corresponds to one of the controls for maneuvering the dog on the surfboard. Other objects may include an image of a lighter 406, an image of a rock 408, or an image of a feather 410, such as those shown in FIG. 3. Such images may also convey a sense of the pressure or force required to interact with the object. For example, a user may have an expectation that more force may be required to interact with a rock than with a feather, or that different forces may trigger different results, such as with the lighter. If the system 200 determines that the user interaction corresponds to an object on the display screen, the method 300 proceeds to block 340, otherwise the method 300 returns to block 320.

In block 340, the system 200 compares the first force to the first threshold and determines whether the first force meets or exceeds the first threshold. If the first force meets or exceeds the first threshold, the method 300 proceeds to block 350. As discussed above, in some examples where hysteretic thresholds are employed, the system 200 may use a different value for the first threshold depending on the state of the system 200. Referring to the state diagram 302 shown in FIG. 2C, if the system 200 is in the exploration mode 380, the first threshold may correspond to a first value, while if the system 200 is in the manipulation mode 354, the first threshold may correspond to a second value. In addition, in some examples, the threshold determination may also include a timing component, in which the force must meet or exceed (or drop below) the first threshold for a minimum duration. Otherwise, the method 300 proceeds to block 342.

In block 342, the system 200 determines whether to output a haptic effect. In this example, the system 200 outputs a haptic effect if the user interaction is at a location corresponding to an object, and will thus proceed to block 344. However, if the user is interacting with a displayed object, in some examples the method returns to block 320 to receive additional user interaction signals. In some examples, the method 300 returns to block 310. The method 300 may return to block 310 to re-determine the first threshold based on usage of the device, such as in the case of an adaptive first threshold.

In block 350, the system 200 outputs a first haptic signal to a first haptic output device, the first haptic signal configured to cause a first haptic effect. In the example shown in FIG. 2A, the first haptic effect is configured to indicate to the user that the first threshold has been reached. In some examples, upon reaching or exceeding the first threshold, the system 200 transitions from an "exploration" mode to a "manipulation" mode. Thus, the haptic effect is configured to indicate to the user the change in operational modes of the system 200 or activation of the object contacted, rather than simply that the threshold has been met. If the system 200 was already in the exploration mode, the system 200 may determine that no haptic effect should be output to indicate the transition, though it may still output a haptic effect if the user interaction (e.g., the user's contact) corresponds to an object displayed on the touch-sensitive display 250. In some examples, the haptic effect may instead only be configured to indicate that the user has begun manipulating the object. After outputting the haptic effect signal, the method 300 proceeds to block 360.

In block 360, the system 200 determines an action to take with respect to the object based on the user interaction. For example, if the object is an icon corresponding to an application, the system 200 may determine the action is to launch the application. Alternatively, the system 200 may determine that the user is attempting to move the icon and may "pick up" the icon to be moved based on movement of the user interaction (e.g., contact location). At a later time, if the force drops below the first threshold, the system 200 may determine the user is dropping the icon, and may leave the icon in the location corresponding to the user interaction location.

Figure 3:
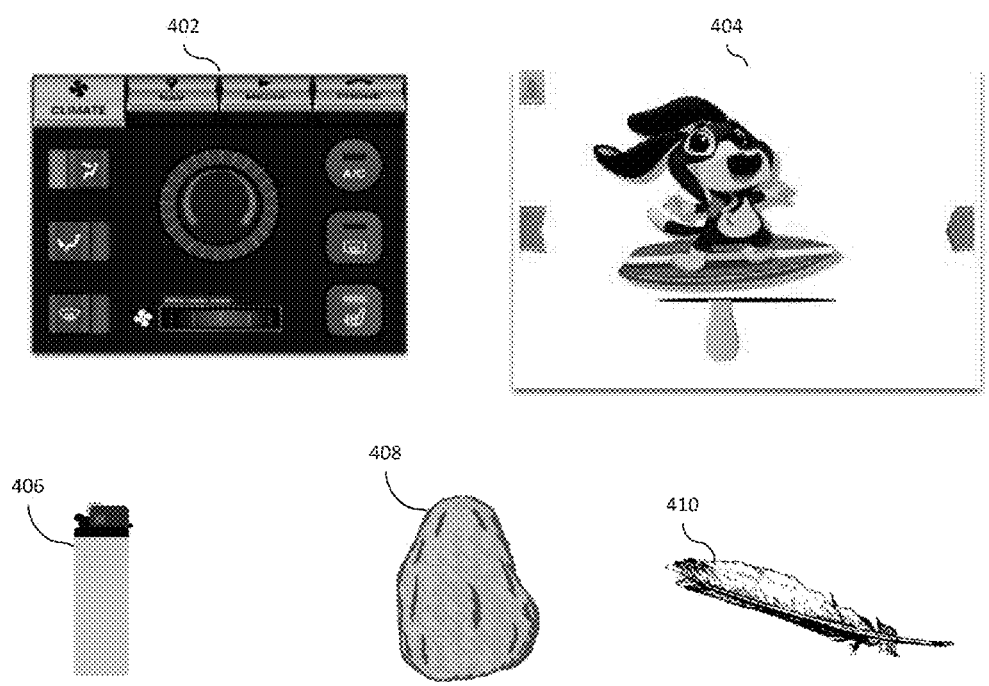
FIG. 3 shows example graphical user interfaces usable with examples of systems and methods for force-based object manipulation and haptic sensations according to the present disclosure.

In the climate control system 402 for a car shown in FIG. 3, the system 200 may determine the action includes changing the state of a button, or selecting a new option or setting for a control, such as a temperature setting or activating/deactivating an air conditioning control. In the gaming application shown in FIG. 3, the system 200 may determine an action corresponding to the game, such as to change the orientation of the dog on the surfboard, or the surfboard itself. After the system 200 determines the action to take, the method 300 proceeds to block 370.

In block 370, the system 200 executes the action. As discussed above, actions such as launching applications, changing settings of controls, and/or inputs into gaming applications may be executed by the system 200 in response to determining the action to be taken.

Figure 2B:
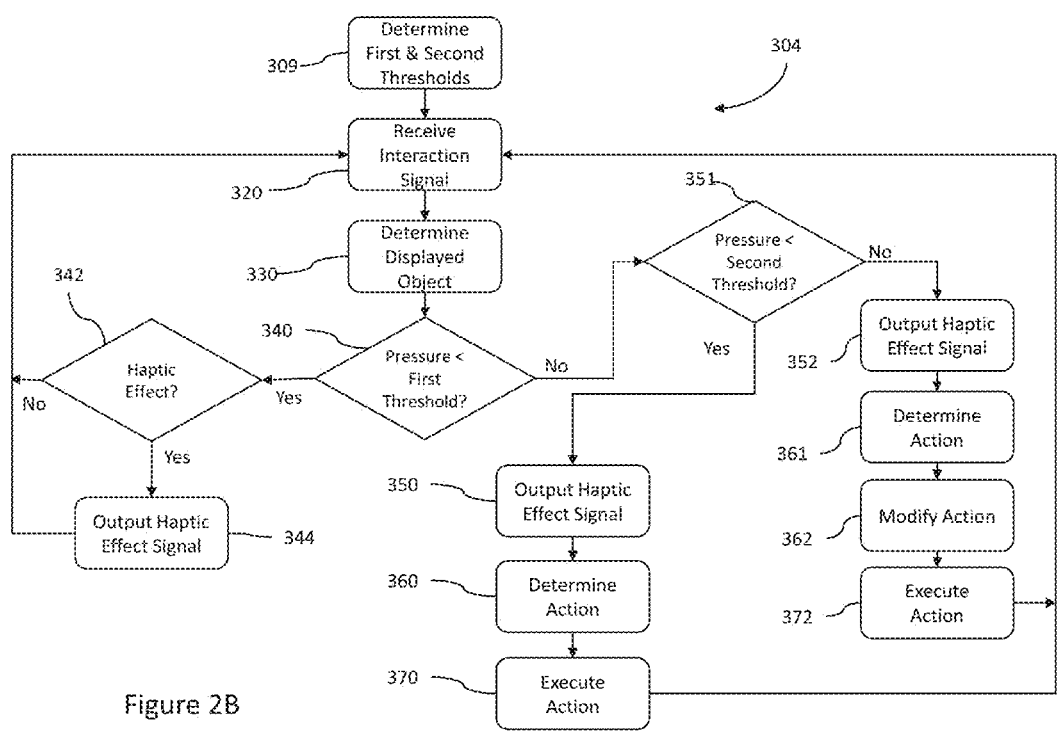
Figure 2C:
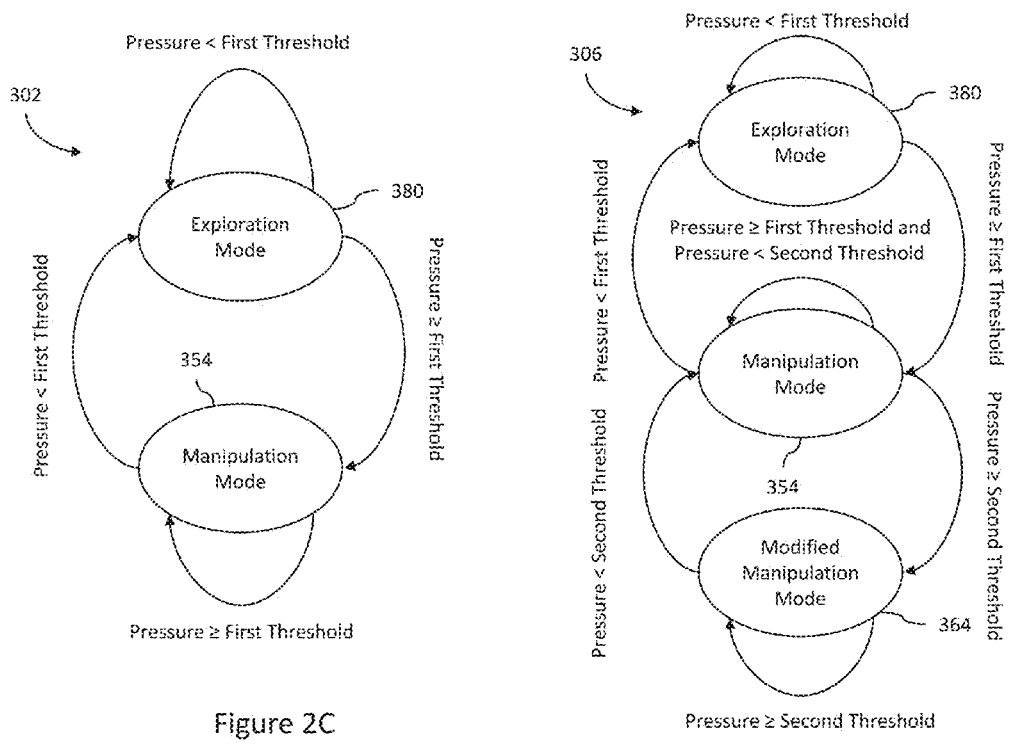
FIG. 2C shows state diagrams for force-based object manipulation and haptic sensations according to examples of the present disclosure.

FIG. 2C depicts a state diagram 302 corresponding to the method 300 shown in FIG. 2A. As may be seen, the state diagram represents two states of operation for the system 200, an exploration mode 380 and a manipulation mode 354. Initially, the system 200 is in the exploration mode 380 where the user may contact the display screen at various locations, but without exceeding the first threshold, the user's contacts do not trigger any actions to be taken by the system 200. Rather, the system 200 outputs haptic effects when the user's contact corresponds to an object displayed on the display screen. However, if the user's contact meets or exceeds the first threshold, the system 200 transitions to the manipulation mode 354, where the user's contacts that correspond to an object may trigger an action with respect to the object. Further, if in the manipulation mode 354, the system 200 may return to the exploration mode 380 if the contact force no longer satisfies the first threshold. In some examples, the system 200 may output haptic effects when the system 200 transitions between states, either from the exploration mode 380 to the manipulation mode 354, of from the manipulation mode 354 to the exploration mode 380. Such transition haptic effects may be used to inform the user of the change in operational mode and provide a more intuitive force-based interface. In other examples, the system 200 may output haptic effects just prior to the system 200 changing between states—e.g., as the contact force approaches the first threshold. This may indicate to the user that the system 200 is about to change states, so the user can avoid changing states inadvertently.

Referring now to FIG. 2B, FIG. 2B is described with respect to a software application executed by the system 200 shown in FIG. 1B; however, the methods disclosed herein are not limited to execution by only the device shown in FIG. 1B, but rather may be executed by any suitable system according to this disclosure.

The method 304 of FIG. 2B begins in block 309. In block 309, the system 200 determines a first threshold. The description of determining a first threshold is provided above with respect to block 310 of FIG. 2A and that description is incorporated herein by reference. In addition, the system 200 also determines a second threshold that is greater than the first threshold. In this context, the second threshold is greater than the first threshold if the absolute value of the magnitude of the second threshold is greater than the absolute value of the magnitude of the first threshold. In some examples, the second threshold may comprise a hysteretic threshold. The second threshold may also comprise a duration. After determining the first and second thresholds, the method 304 proceeds to block 320.

The descriptions of blocks 320-344 are the same as for FIG. 2A above, and that description is incorporated herein by reference. However, after comparing the first force to the first threshold in block 340, the method 304 proceeds to block 351.

In block 351, the system 200 compares the first force to the second threshold. If the first force is less than the second threshold, the method 304 proceeds to block 350. Otherwise, the method 304 proceeds to block 352.

In blocks 350, 360, and 370, as discussed above with respect to FIG. 2A, incorporated here by reference, the system 200 outputs a haptic effect signal, determines an action to take with respect to the object based on the user interaction, and executes the action, respectively. The method 304 then proceeds to block 320.

In block 352, the system 200 outputs a haptic effect signal. This step can be performed substantially similarly to block 350 discussed above with respect to FIG. 2A. After outputting the haptic effect signal, the method 304 proceeds to block 361.

In block 361, the system 200 determines an action. This step can be performed substantially similarly to block 350 discussed above with respect to FIG. 2A. After determining the action, the method 304 proceeds to block 362.

In block 362, the system 200 modifies the action to be taken. For example, if the determined action is to launch an application corresponding to an icon, the system 200 may instead determine to modify the action to move the icon away from the user interaction (e.g., a cursor location or the user's contact) and provide a vibratory haptic effect. Referring again to FIG. 3, if the user is interacting with the climate control system 402 and contacts the A/C button, the system 200 may determine the action is to enable the A/C and also change the temperature setting to a minimum temperature setting. Or if the user is interacting with the game 404, the system 200 may determine that the action should be modified to flip the surfboard over causing the dog to fall into the water. In other examples, the determined action may be modified in different ways. After modifying the action, the method 304 proceeds to block 372.

In block 372, the system 200 executes the modified action. This step can be performed substantially similarly to block 370 discussed above with respect to FIG. 2A.

FIG. 2C also depicts a state diagram 306 corresponding to the method 304 shown in FIG. 2B. The state diagram 306 represents three modes or states of operation for the system 200, an exploration mode 380, a manipulation mode 354, and a modified manipulation mode 364. Initially, the system 200 is in the exploration mode 380 where the user may contact the screen at various locations, but without exceeding the first threshold, the user's contacts do not trigger any actions to be taken by the system. Rather, the system 200 outputs haptic effects when the user's contact corresponds to an object displayed on the screen. However, if the user's contact meets or exceeds the first threshold, the system 200 transitions to the manipulation mode 354, where the user's contacts that correspond to an object may trigger an action with respect to the object. If the user's threshold then further meets or exceeds the second threshold, the system 200 transitions to the modified manipulation mode 364, as described above with respect to method 304. Further, if in the manipulation mode 354, the system 200 may return to the exploration mode 380 if the contact force no longer satisfies the first threshold. Likewise, if in the modified manipulation mode 364, the system 200 may return to the manipulation mode 354 if the contact force no longer satisfies the second threshold.

Figure 4:
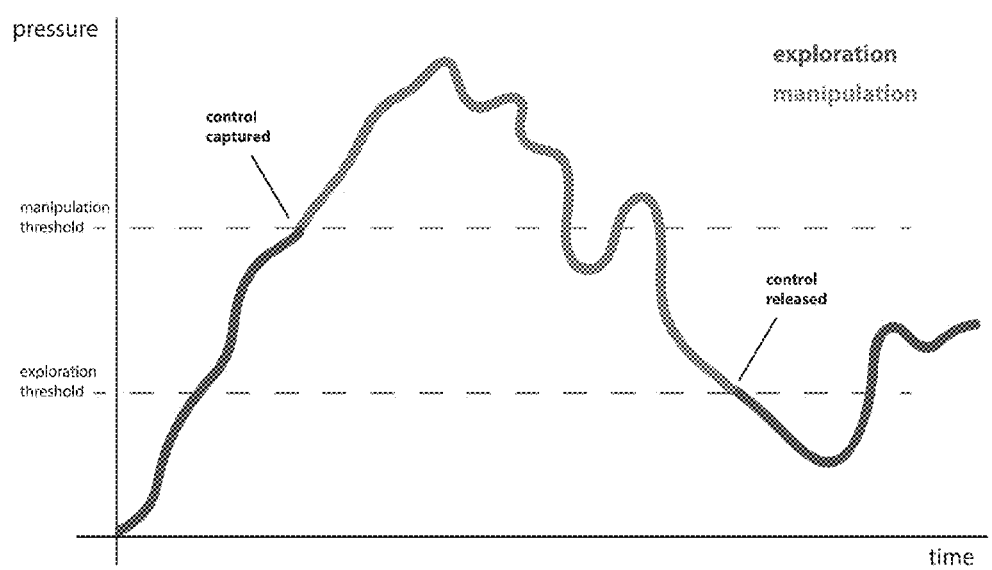
FIG. 4 shows an example graph of forces associated with user interaction with a force-sensitive surface according to examples of the present disclosure.

Referring now to FIG. 4, FIG. 4 shows a graph of a user's force applied to a force-sensitive surface (e.g., a force-sensitive button, mouse, trackball, joystick, or touch-sensitive surface) over time in an example employing two modes, an exploration mode and a manipulation mode. In considering the graph shown in FIG. 4 with respect to the method 300 shown in FIG. 2A, the first threshold of FIG. 2A in this example comprises a hysteretic threshold in which the first threshold has two values: one value that is used while the system 200 is in the exploration mode, and a second value that is used while the system 200 is in the manipulation mode. In such an example, the user may use the exploration mode until the applied force exceeds the higher of the two values for the first threshold, at which point the system 200 transitions to the manipulation mode. As the user continues to interact with the system 200, the force of the user's contact may change and drop below the higher of the two values of the first threshold, while remaining above the lower of the two values of the first threshold. Thus, the user will remain in the manipulation mode despite a contact force dropping below the upper range of the threshold that triggered the transition from exploration to manipulation.

Figure 5A:
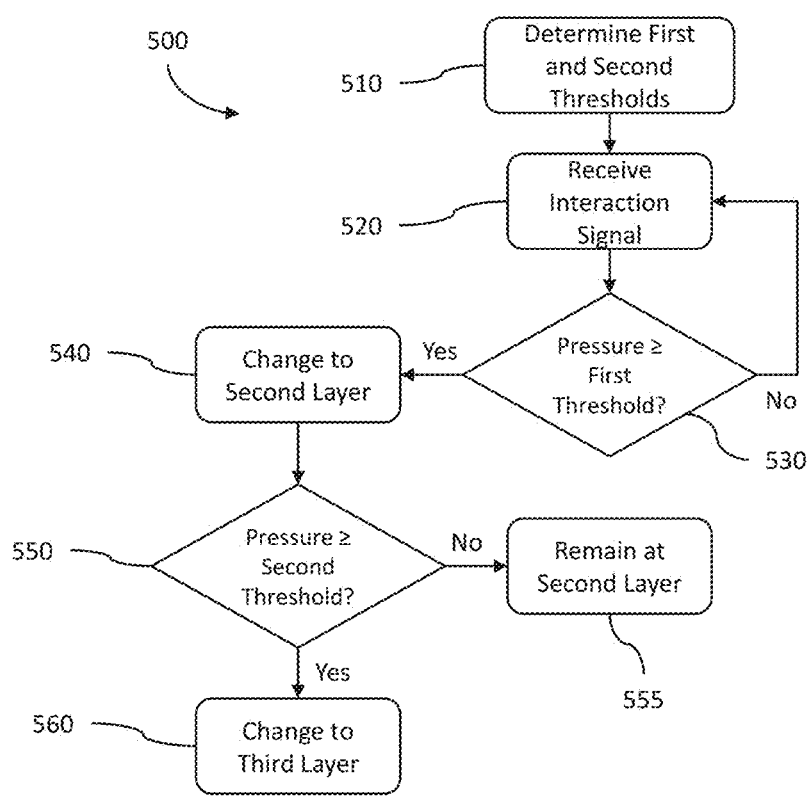
FIG. 5A shows a method for force-based object manipulation and haptic sensations according to examples of the present disclosure.
Figure 5B:
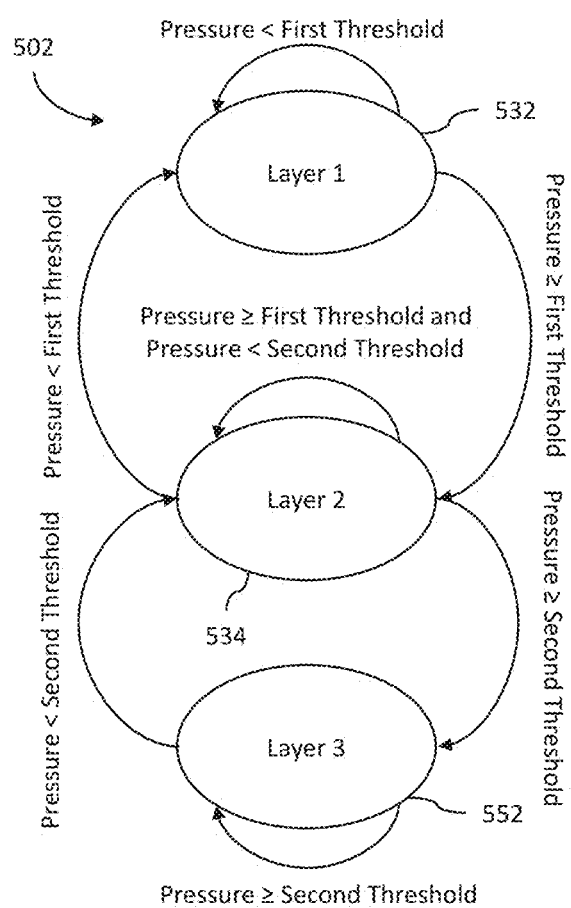
FIG. 5B shows a state diagram for force-based object manipulation and haptic sensations according to examples of the present disclosure.

Referring now to FIG. 5A, FIG. 5A shows a method 500 for force-based object manipulation and haptic sensations according to one example of this disclosure. FIG. 5B shows a state diagram 502 associated with the method 500 of FIG. 5A. FIG. 5A is described with respect to a software application executed by the system 200 shown in FIG. 1B; however, the methods disclosed herein are not limited to execution by only the device shown in FIG. 1B, but rather may be executed by any suitable system according to this disclosure.

The method of FIG. 5A may be advantageously employed to provide force-based navigation in a user interface having multiple layers. For example, as discussed above with respect to some illustrative examples, a user interface for a map application may have multiple different views of the same portion of the map. In one example, the map may provide a city map layer, a road map layer, and a terrain map layer. As the user increases the contact force on a force-sensitive surface (e.g., touch-sensitive display 250), the user interface may transition between layers of the user interface based on the contact force. This may allow the user to easily and seamlessly transition to different views without the need to locate menu options or controls to perform the function. In some examples, the user can customize what information is output at each layer of the user interface. For example, the user may be able to customize whether a city map, road map, or terrain map is output at a particular layer of the user interface.

In addition, by transitioning to different layers, the system 200 may provide different sets of haptic sensations. For example, in a mapping application having multiple layers with different types of visual information, the system 200 may switch between different sets of haptic information, or may select different haptic effects from a larger library of haptic effects. For example, when the mapping application is displaying information regarding the first layer, e.g. a city map layer, the system 200 may provide haptic effects when a user interacts with a virtual city shown on the map via the force-sensitive surface (e.g., by contacting a location on a touch-sensitive display 250 or via a cursor). Such a haptic effect may include increased friction, such as provided by ESF, or may include a pulsed vibration output by an actuator. For example, the intensity of the vibration, or the size of the area with increased friction, may vary with the population of the city or the geographic size of the city.

In some examples, the system 200 may output haptic effects configured to provide information about the layer to the user. For instance, the system 200 may output a number of vibration pulses corresponding to the layer number. The user may perceive the pulses and be able to determine, e.g., without visually focusing on the input device or a display, what layer of the user interface that the user is interaction with or what state the system 200 is in. This may be particularly advantageous if the system 200 is in a car, so the user can focus on the road. As another example, the system 200 may output haptic effects configured to provide the user with information about the number of available user interface levels. For example, upon a user using the input device to interact with an object, the system 200 may output a number of vibration pulses corresponding to the number of user interface levels with which the user can interact. This may provide the user with information about the user interface that, in some examples, the user may not otherwise know.

If the user increases the force applied to the force-sensitive surface, the system 200 transitions to the second layer of the mapping application, which may correspond to a road map layer. In such an example, the system 200 may output ESF haptic effects when the user's contact corresponds to a road. Further, the system 200 may generate haptic effects that correspond to the shape of the roads to allow the user to tactilely trace roads, or the type of road (unpaved, city street, state highway, interstate highway) to allow the user to experience a richer or more intuitive interaction with the mapping application. In some examples, the system may change both the visual display and the haptic effects following the transition to the second layer, or may leave the visual display unchanged, but change the haptic effects to provide effects associated with the second layer. Thus, the user may continue viewing a satellite map of a region, but by pressing harder, may transition from feeling cities to feeling different roads.

If the user again increases force applied to the force-sensitive surface, the system 200 transitions to the third layer to provide a visual representation of the terrain for the displayed portion of the map. The system 200 then provides haptic effects that correspond to the different types of terrain displayed. For example, the system 200 may deform the surface of the force-sensitive surface to feel sharp or prickly to indicate trees, while prairies or open spaces may have reduced friction to feel smooth. Other features, such as hills or mountains may be haptically displayed such as by using bumps of varying size, or by outputting vibrations of different frequencies or having differently-timed pulses. Further, and as discussed above, in some examples, the system may leave the visual display unchanged, but change the haptic effects to provide effects associated with the third layer. Thus, the user may continue viewing a satellite map of a region, but by pressing harder, may transition from feeling different roads to feeling the various types of terrain displayed on the map.

Still other examples may include a greater or lesser number of layers, and may use different haptic effects, or different haptic output devices or combinations of haptic output devices, based on the layer selected by the user.

In another example, such a layered user interface may be employed in a drawing application to expose user interface cues to aid in the drafting process. For instance, by increasing an amount of force on a force-sensitive surface, the user interface may display aids such as horizon lines, alignment grids, perspective lines, or in a CAD system, may peel away layers of foreground objects to expose other objects that are otherwise hidden by objects "nearer" to the user within the drawing. In another example, the user may be able to navigate through different layers of three-dimensional images, such as three-dimensional scans resulting from medical procedures such as CT scans or MRIs.

Another example may comprise a multi-layered or three-dimensional user interface. For example, a user interface may be displayed as a tiled set of icons corresponding to applications, but display additional icons in deeper "planes" or layers of the user interface. To access these additional layers, the user may increase force on the force-sensitive surface. Once the user has accessed the deeper layer, the user may reduce the force on the force-sensitive surface and remain at the new layer, or may reduce the force on the force-sensitive surface further to return to a prior layer.

Still another example may comprise a multi-layered "circular" user interface. For example, a user interface for a mapping application may have three layers: a city layer, a road layer, and a terrain layer. Each time the user applies an amount of force exceeding the threshold to the force-sensitive surface, the system can transition to the next layer. Upon reaching the last layer, if the user applies an amount of force exceeding the threshold, the system can transition back to the first layer. For example, the user interface for the mapping application may output (e.g., by default) the city layer. The user may apply an amount of force exceeding the threshold to cycle to the road layer. The user may again apply an amount of force exceeding the threshold to cycle to the terrain layer. If the user again applies an amount of force exceeding the threshold, the system can cycle back to the city layer. In this manner, the user can cycle or transition through the user interface layers by applying an amount of force exceeding the threshold.

The method 500 of FIG. 5 begins at block 510 where the system 200 determines first and second thresholds. The description of determining the first and second thresholds is provided above with respect to block 309 of FIG. 2B, which is incorporated here by reference. After the system 200 determines the first and second thresholds, the method 500 proceeds to block 520.

In block 520, the system 200 receives one or more signals indicating a user interaction with a force-sensitive surface, the one or more signals comprising a first force and/or a first location. The force-sensitive surface can be in communication with a processor-based device, and the processor-based device can be in communication with a display screen and providing a graphical user interface (GUI) having a plurality of layers. The display screen can display a first layer of the GUI.

In block 530, the system 200 compares the first force to the first threshold. If the first force meets or exceeds the first threshold, the method proceeds to block 540. Otherwise, the method returns to block 520.

In block 540, the system 200 generates a signal configured to cause a second layer of the GUI to be displayed on the display screen, and transmits the signal to cause the second layer to be displayed. After changing to the second layer, if there are additional layers, the method proceeds to block 550.

In block 550, the system 200 compares the first force to the second threshold. If the first force meets or exceeds the second threshold, the method proceeds to block 560. Otherwise, the system remains at the second layer, as depicted in block 555.

In block 550, the system 200 generates a signal configured to cause a third layer of the GUI to be displayed on the display screen, and transmits the signal to cause the third layer to be displayed.

In some examples, more than three layers may be employed. In some such examples, additional thresholds may be used to trigger transitions to additional layers.

FIG. 5B depicts a state diagram 502 depicting the states and transitions between the states corresponding to the method 500 shown in FIG. 5A. The state diagram 502 represents three different layers for the GUI of system 200: Layer 1 state 532, Layer 2 state 534, and Layer 3 state 552. Initially, the system 200 is in the Layer 1 state 532 where the user may contact the display screen at various locations, but without exceeding the first threshold, the user's actions do not trigger a change to another layer. However, if the user's contact meets or exceeds the first threshold, the system 200 transitions to the Layer 2 state 534. If the user's threshold then further meets or exceeds the second threshold, the system transitions to the Layer 3 state 552, as described above with respect to method 304.

Figure 6:
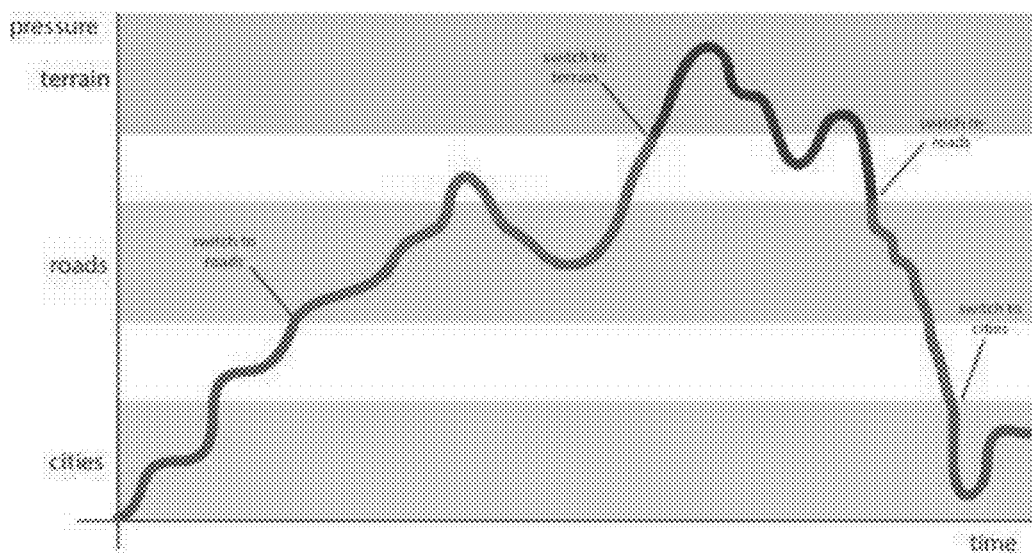
FIG. 6 shows an example graph of forces associated with user interaction with a force-sensitive surface according to examples of the present disclosure.

Referring now to FIG. 6, FIG. 6 shows a graph of a user's force applied to a force-sensitive surface over time in an example employing a user interface for a mapping application that has three layers: a city layer, a road layer, and a terrain layer. The graph shown in FIG. 6 corresponds to one example of the method 500 shown in FIG. 5A. In this example, the first and second thresholds of FIG. 5A each comprise a hysteretic threshold wherein the thresholds each have two values: one value that is used while the system 200 is in a higher layer, and a second value that is used while the system 200 is in a lower layer. In such an example, the user may interact with the city layer of the user interface until the applied force exceeds the higher of the two values for the first threshold, at which point the system 200 transitions to the road layer of the mapping application. As the user continues to interact with the system 200, the force of the user's contact may increase above the second threshold, causing the system 200 to transition to the terrain layer of the mapping application.

As the user continues to navigate within the mapping application, the force applied by the user to the force-sensitive surface may drop below the second threshold, returning the system to the road layer of the mapping application. And ultimately, the user reduces the force below the first threshold, and the system 200 transitions the mapping application to the city layer.

In some examples, the first threshold and second threshold can be configured such that a force range (a force gap) is between the first threshold and the second threshold. The system 200 can output haptic effects if the user applies an amount of force that falls within this force range. For example, if the force applied by the user falls between the force threshold for the city layer and the force threshold for the road layer, the system 200 can output a haptic effect comprising a pulse. This may increase the stability of the system 200, as it may alert that user that the she is about to change layers and/or prevent a user from inadvertently switching between user interface layers.

Figure 7:
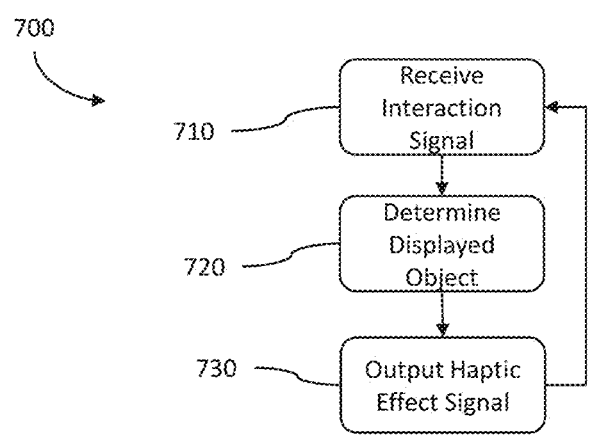
FIG. 7 shows a method for force-based object manipulation and haptic sensations according to examples of the present disclosure.

Referring now to FIG. 7, FIG. 7 shows a method 700 for force-based object manipulation and haptic sensations according to one example of this disclosure. FIG. 7 is described with respect to a software application executed by the system 200 shown in FIG. 1B; however, the methods disclosed herein are not limited to execution by only the device shown in FIG. 1B, but rather may be executed by any suitable system according to this disclosure.

The method 700 of FIG. 7 begins in block 710 when the system 200 receives one or more signals indicating a user interaction with a force-sensitive surface, the one or more signals comprising a first force and/or a first location. For example, as a user touches the touch-sensitive display 250, the touch-sensitive display 250 may provide one or more signals indicating a location of the contact and an amount of force. In some examples, as discussed above, the system 200 may include a touch-sensitive display 250 that provides a signal indicating a location of a contact, and a separate force sensor 290 that provides force information. Thus, multiple signals may be received and used according to some examples. In some examples, a single signal may include both location information and force information. After the one or more signals are received, the method 700 proceeds to block 720.

In block 720, the system 200 determines whether the user interaction corresponds with an object displayed on a display screen (e.g., based on the first location or the location of an associated cursor). For example, if the display screen shows a home screen having a plurality of icons and widgets, the system 200 determines whether an interaction with a touch-sensitive display 250 is at a location corresponding to an icon or widget. In some examples, other objects may be displayed by the system 200. For instance, the system 200 may display controls for a user interface system for a car on the display screen, such as the climate control system 402 shown in FIG. 3. In such an example, the system 200 may determine whether the user interaction corresponds to a control displayed on the screen, such as an "A/C" control or a defroster control. In another example corresponding to a touch-based game, such as the game 404 shown in FIG. 3, the system 200 may determine whether the user interaction corresponds to one of the controls for maneuvering the dog on the surfboard. Other objects may include an image of a lighter 406, an image of a rock 408, or an image of a feather 410, such as those shown in FIG. 3. After determining that the user interaction corresponds to an object, the method 700 proceeds to block 730.

At block 730, the system 200 generates a first haptic signal (e.g., based on the first force and a texture associated with the object) configured to cause a haptic output device 240, 280 to output a first haptic effect having a first intensity, and outputting the first haptic signal to the haptic output device 240, 280. For example, icons, widgets, or other graphical objects may be associated with a texture. As a user draws a finger across a graphical object, she may feel a texture-based haptic effect. In this example, the texture sensation varies based on the force exerted on the force-sensitive surface by the user. Thus, if the user only lightly contacts the touch-sensitive display 250 at a location corresponding to a graphical object, she may feel only the edges of the object (e.g., edge haptic effects) but little or no tactile information relating to the object's texture. However, as the user increases the contact force, the system 200 generates and outputs haptic effects that are increasingly more representative of the texture associated with the object.

For example, referring to the images shown in FIG. 3, a user touching the rock may feel only the general shape of the rock when pressing lightly against the touch-sensitive display 250. However, if the user increases the contact force, the user may feel the roughness of portions of the rock and the smoothness of other portions. And if the user continues to increase the contact force, she may feel fine details about the texture of the rock, such as small cracks or bumps on the rock, or the graininess of rock. Further, by increasing the force on the rock, the apparent size of the rock (visually, tactilely, or both) may increase to allow the user to tactilely explore the surface features of the rock in more detail by further increasing the force on the rock. In this example, the level of detail of the haptic sensations increases approximately linearly with the increase in contact force. In other examples, the level of detail of the haptic sensations may not increase linearly. For instance, the level of detail of the haptic sensations may increase logarithmically. In some examples, a texture may have different texture "layers," similar to the user interface layers discussed above with respect to FIGS. 5-6, such that as the user's force increases, it reaches thresholds at which a different texture layer is presented through haptic effects.

Some examples may provide additional haptic texture effects based on user interaction. For example, referring to FIG. 8A, two different haptically-enabled software applications 810, 820 are shown. The first software application 810 presents the user with multiple different animals with different types of skin or fur that the user can interact with tactilely to feel the different textures. For example, if the user interacts with the sheep via the force-sensitive surface, the system 200 may output a deformation effect that feels soft or malleable to the user to emulate the sheep's wool, or a rough texture for the wolf's wiry coat, or a smooth or slippery (e.g., low friction) texture for the goldfish, or a ridged texture for the armadillo's shell.

In addition, the system 200 is configured to increase the intensity of the effect as the user presses harder against the force-sensitive surface (e.g., touch-sensitive display 250). For example, the system 200 may employ the following mapping function to adjust the intensity of a haptic effect:

$$V(\ldots)=k(P) \cdot F(\ldots) \quad \text{Equation 1:}$$

In Equation 1, V corresponds to the output voltage for a haptic output device 240, 280, F( . . . ) identifies a texture or other rendering effect, and k(P) provides a mapping function that maps the force P to a value between 0.0 and 1.0. In some examples, a different function, such as the following function, may be used:

$$V(\ldots)=k(P) \cdot F(\ldots)+(1-k(P)) \cdot G(\ldots) \quad \text{Equation 2:}$$

In Equation 2, V corresponds to the output voltage for a haptic output device 240, 280, F( . . . ) and G( . . . ) provide textures or other rendering effects, and k(P) provides a mapping function that maps the force P to a value between 0.0 and 1.0. Other examples may provide additional texture or rendering effect functions, or different weighted relationships between those effect functions.

Figure 8A:
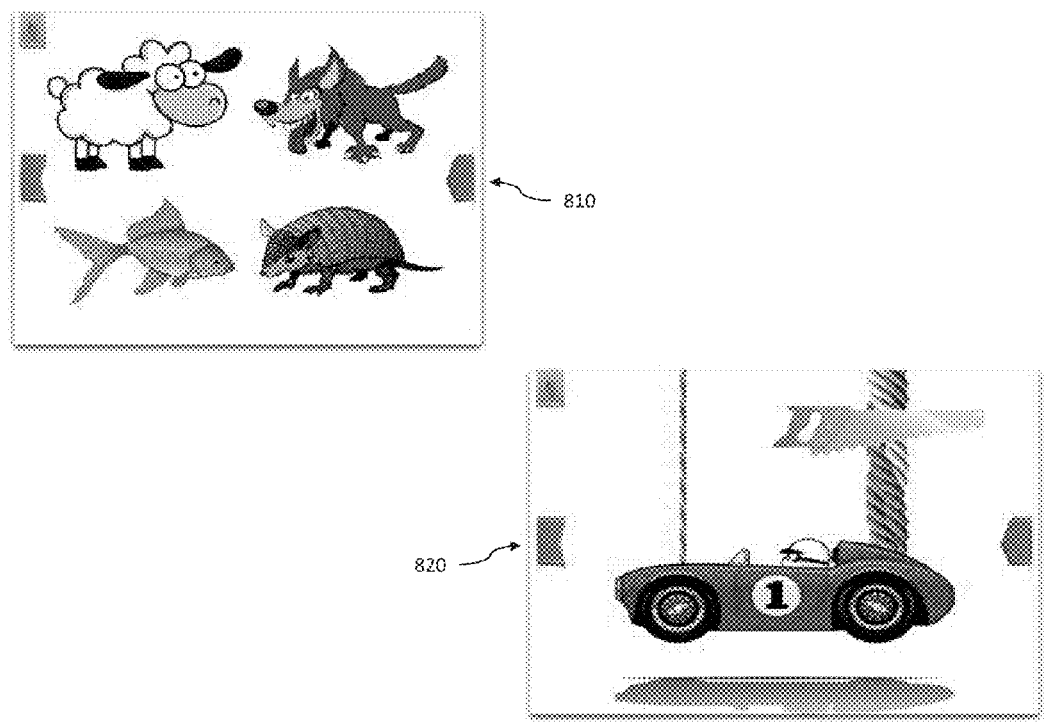
FIGS. 8A-B show software applications for providing force-based object manipulation and haptic sensations are shown according to examples of this disclosure.

In the second software application 820 shown in FIG. 8A, the user may be able to manipulate the displayed saw to cut through either or both ropes. In one example, to manipulate the saw, the user may press on the saw and move her finger back and forth in a sawing motion. In another example, to manipulate the saw, the user may move the force-sensitive surface (e.g., a mouse or joystick) back and forth in a sawing motion while interacting with a manipulandum (e.g., a mouse or joystick button) with a particular amount of force. This may move the virtual saw back and forth. The system 200 provides vibrational or frictional effects based on the speed at which the user saws, but also based on the force exerted by the user on the force-sensitive surface. As the user increases the force applied to the force-sensitive surface, the saw may cut more deeply into the rope, and thus the user may feel increased friction, or increased vibration to indicate that the saw is exerting more force or that more fibers of the rope are being cut. Examples according to the second software application 820 may also employ mapping equations like those used with respect to the first software application 810 discussed above. And while this software application incorporates the use of saws, other applications, such as drawing or painting applications, or other applications employing tools, may provide similar effects and responses based on the user's manipulation of the respective tool (e.g., a pen or paintbrush) as well as the force applied to the tool.

Figure 8B:
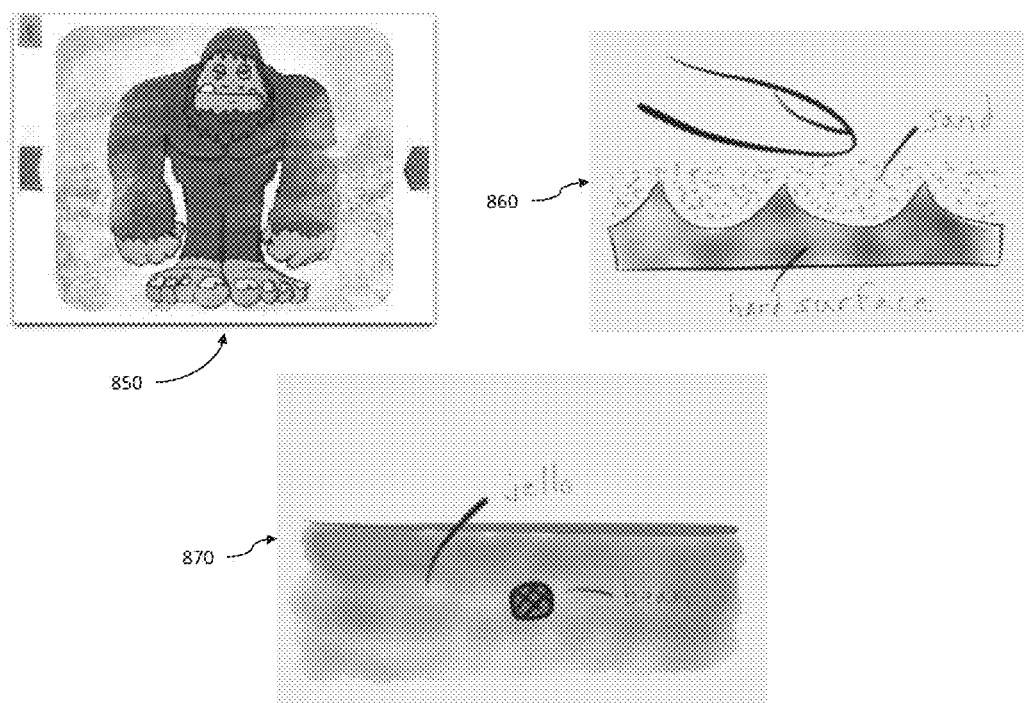

Referring now to FIG. 8B, three additional software applications 850, 860, 870 for providing force-based object manipulation and haptic sensations are shown. Software application 850 initially displays an image of Bigfoot encased in ice or frost, and the user is able to free him by scraping away the frost. In some examples, as the user lightly drags her finger back and forth across the screen, no frost is scraped away, but the user may feel a smooth uniform texture or reduced friction to emulate sliding her finger over ice. If she slightly increases the force to scrape away the frost, she feels a mild frictional force provided by an ESF output device as well as a low-magnitude vibration provided by an actuator to emulate the feel of her finger scraping away the frost. As the user increases the force of the contact, the system 200 employs a mapping function, such as shown in Equation 2 above, to increase the intensity of the haptic effects, which may also trigger aspects of the haptic effects that are only presented when sufficient force is applied, such as irregularities in the frost. For example, F( . . . ) may correspond to the frictional effect while G( . . . ) may correspond to the vibrational effect. In addition, a greater quantity of frost may be removed.

In software application 860, the system 200 displays to the user an apparently uniform field of sand, which is overlaid on a hard, ridged surface. That is, a lower virtual object (e.g., the hard, rigid surface) can be layered beneath an upper virtual object (e.g., the field of sand). In some examples, as the user interacts with (e.g., lightly drags her finger over) the surface, the system 200 generates and outputs a haptic effect associated with a characteristic (e.g., a texture) of the upper virtual object. For example, the system 200 may generate and output a texture effect associated with the field of sand, such as a haptic effect comprising a grainy or gritty texture. Such effects may be provided by an ESF or deformable haptic output device. If the user applies force with a greater intensity to the surface, the system 200 may generate and output one or more haptic effects associated with the lower virtual object. For example, as the user increases the contact force, the underlying hard surface becomes apparent from a change in the texture effect. In this example, rather than simply changing the scaling factor for, e.g., Equation 1, instead the system 200 adds a second haptic texture, such as by transitioning to Equation 2. In some examples, though, the system 200 may always use Equation 2, but instead may provide zero weight to the texture effect corresponding to the hard surface below a minimum force. Thus, the user is able to, tactilely, determine the existence of information that is not presented visually, i.e., the existence of the hard surface beneath the sand.

The software application 870 provides functionality similar to that of the software application 860 in that the user is initially presented with a first texture. In this example, the first texture may be a deformation effect that provides a soft or squishy feeling to emulate the feel of gelatin. However, in certain areas within the gelatin, a hard object may be present, such as the bean shown in FIG. 8B. In some cases, the object may be visible, while in others it may not. In some examples, as the user drags her finger over the display screen and encounters the bean, the nature of the haptic effect may change to indicate the presence of the bean. For example, as the user presses down with increasing force, the system 200 outputs a firmer deformation to indicate the presence of the bean surrounded by the softer deformation corresponding to the gelatin. In some examples, the size of the firmer deformation may correspond to the size of the bean, while in other examples, so long as the user's contact corresponds to the location of the bean, the firmer deformation effect is provided.

Figure 9:
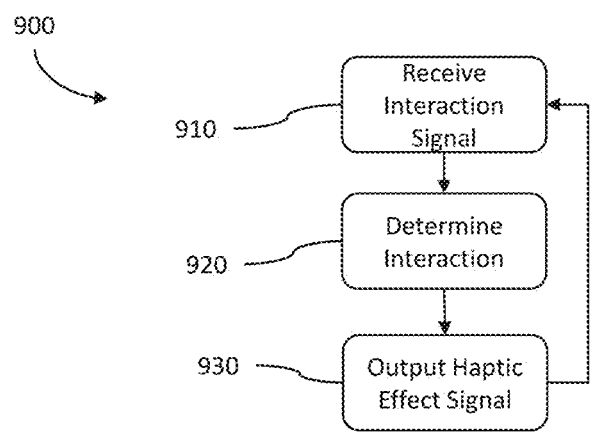
FIG. 9 shows a method for force-based object manipulation and haptic sensations according to examples of the present disclosure.

Referring now to FIG. 9, FIG. 9 shows a method 900 for force-based object manipulation and haptic sensations according to one example of the present disclosure. FIG. 9 is described with respect to a software application executed by the system 200 shown in FIG. 1B; however, the methods disclosed herein are not limited to execution by only the device shown in FIG. 1B, but rather may be executed by any suitable system according to this disclosure.

The method 900 shown in FIG. 9 begins in block 910 when the system 200 receives one or more signals indicating a user interaction with a force-sensitive surface, the one or more signals comprising a first force and/or a first location. The signals may be from the touch-sensitive display 250 or the force sensor 290. For example, as a user touches the touch-sensitive display 250, the force-sensitive surface may provide one or more signals indicating a location of the contact and an amount of force of the contact. In some examples, as discussed above, the system 200 may include a touch-sensitive display 250 that provides a signal indicating a location of a contact, and a separate force sensor 290 that provides force information. Thus, multiple signals may be received and used by the system 200. In some examples, a single signal may include both location information and force information. After the one or more signals are received, the method 900 proceeds to block 920.

In block 920, the system 200 determines an interaction between the user and the system 200. Such interactions may include virtually any interaction of the user with the system 200. For example, a user may desire to move an icon from one location to another on the touch-sensitive display 250. In such an example, the user may press on an icon located on the touch-sensitive display 250. As the user increases the force on the touch-sensitive display 250, the user's contact may pass a threshold at which the system 200 determines the user is attempting to move the icon. The method 900 then proceeds to block 930.

At block 930, after determining that the user is attempting to move the icon, the system 200 outputs a haptic effect, such as a brief detent effect. The method 900 then returns to block 910, and proceeds again to block 920. In the second iteration of block 920, the user moves her finger to a new location on the screen. In this case, because the user has "picked up" the icon, the system 200 moves the icon to the new location by following the user's finger motion. The method 900 again proceeds to block 930. At block 930, the system 200 provides haptic effects to facilitate movement of the icon, such as reducing a frictional force on the touch-sensitive display 250 (e.g., via an ESF or USF haptic output device). Again, the method returns to block 910.

At block 910, the system 200 continues to receive user interaction signals. This may result from the user's continued contact with the force-sensitive surface (e.g., the touch-sensitive display 250), and proceeds to block 920. However, at this time, the user reduces the force on the force-sensitive surface, but does not lift her finger entirely off of the force-sensitive surface, to "drop" the icon at the new location. The system 200 determines that the user's contact force has dropped below the threshold to permit moving the icon, and the system 200 determines that the icon is being dropped. The method 900 proceeds to block 930, where the system 200 outputs another haptic effect, such as a brief detent. This may indicate the completion of the move operation. Thereafter, the method 900 again returns to block 910 to await continued interaction with the system 200.

The example above is exemplary of use of force-based interactions with systems according to this disclosure. However, other force-based interactions are contemplated. For example, a user may use force to navigate a cursor within a three-dimensional environment. In one such example, lateral movement on the touch-sensitive display 250 may correspond to X- and Y-axis displacements within the environment, while increased or decreased force may result in a rate-based displacement in a Z-axis. To differentiate between positive and negative movements along the Z-axis, the system 200 may output different vibrational or other haptic effects. Or the system 200 may output a haptic effect at a midpoint force at which no Z-axis movement occurs to aid the user in maintaining the Z-axis position, while moving laterally in the X- or Y-axes.

In a further example, the system 200 may provide an enhanced capability for unlocking the device after it has sat idle for an extended period of time. For instance, after a period of inactivity, the system 200 may lock itself to prevent unauthorized use. To unlock the device, the user may enter a passcode. Alternative, the user may perform a force-based gesture. For example, the user may swipe her finger across the screen from left to right and press heavily three times in rapid succession to unlock the device. Or such a force-based gesture may be combined with a traditional motion-based gesture. For example, the user may swipe a zigzag pattern across the touch-sensitive display 250, and press heavily during each change in direction, to unlock the device.

In addition, such an unlocking mechanism may incorporate haptics to assist the user's use of force. For example, when performing the force-enhanced swipe gesture, one example may provide one of three different haptic textures corresponding to three different force level "bands." In this example, the textures increase in "grittiness" as the user transitions from a lower force band to a higher force band. In some examples, the system may output a brief detent to indicate the change in force bands. Thus, the user is aided by the device as she attempts to apply the appropriate amounts of force. Such an example may also aid the user in remembering the force sequence as a sequence of tactile responses, or even as a sequence of numbers corresponding to the different force bands. For example, the user's force code may be mnemonically recalled as 1,2,3,2,3,1, to correspond to each of the 3 force bands. Although three force bands are used in this example, some examples may employ a greater number or lesser number of force bands.

In some examples, contact force may be an integral part of playing video games. For instance, a user playing a golf game may swing a club by first swiping in one direction to create a backswing, and then swing in the opposite direction to swing the club. To enhance the game, the user may also be required during the swing to press hard at the moment the user's finger passes over the ball to strike the ball. The more accurately the user's high-force contact corresponds to the location of the ball, the more accurate the ball strike may be, or the longer distance the drive may be. To assist the user in performing the swing, examples may provide haptic effects corresponding to aspects of the golf swing. For instance, the haptic effect may provide tactile feedback to the user based on the "quality" of the swing. In one such example, as the user draws the club head back in the backswing, the user may be required to follow a particular path, or apply appropriate force at particular times. The system 200 may output haptic effects, such as reducing friction along the correct backswing path, and providing textures at force points. Further, at the force points, the system 200 may output haptic effects configured to assist the user in applying the correct amount of force. For example, upon reaching a force point, the user may increase force until the system 200 outputs a detent, at which point the user may continue the backswing motion. Further, during the swing and contact with the ball, the user may increase force to strike the ball, and may receive immediate tactile feedback, such as a vibrational effect that varies in magnitude based on the accuracy of the force applied to the ball and the location of the force.

In addition, as with the backswing, the system 200 may provide a texture effect at the location of the ball to aid the user in applying increased force at the proper location. Further, the system 200 may provide one or more force-activated vibration detents at the ball corresponding to the amount of power to strike the ball with. Thus, the user may both interact with the system 200 by applying varying levels of force, but may also receive haptic feedback both to assist the user in applying the appropriate amount of force, as well as to guide the user while performing certain tasks.

In addition to allowing the user to incorporate force changes into interactions with systems 200 according to the present disclosure, some examples may also assist the user during such force-based manipulations. For example, as the user increases the contact force with the touch-sensitive display 250, the system 200 may output a haptic effect configured to reduce the coefficient of sliding friction. This may allow the user to more easily drag her finger across the device. In one example, the system 200 increases the haptic effect in direct proportion to the force applied to the device by the user. Such functionality may allow the user to more easily apply higher force to the device without also applying increased lateral force to allow her finger to move across the surface of the device. In other examples, the system 200 may change the magnitude of the haptic effect by applying the contact force to another algorithm, such as a logarithmic scale. In some examples, the system 200 may apply a changing texture to the touch-sensitive display 250 to indicate the increasing forces sensed by the device. Such changing texture may indicate to the user that she may potentially enter a different interaction mode, such as a manipulation mode described above, if she continues to increase the contact force.

While the methods and systems herein are described in terms of software executing on various machines, the methods and systems may also be implemented as specifically-configured hardware, such as field-programmable gate array (FPGA) specifically to execute the various methods. For instance, examples can be implemented in digital electronic circuitry, or in computer hardware, firmware, software, or in a combination thereof. In one example a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Examples of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one example" or "an example" means that a particular feature, structure, operation, or other characteristic described in connection with the example may be included in at least one implementation of the invention. The invention is not restricted to the particular examples described as such. The appearance of the phrase "in one example" or "in an example" in various places in the specification does not necessarily refer to the same example. Any particular feature, structure, operation, or other characteristic described in this specification in relation to "one example" may be combined with other features, structures, operations, or other characteristics described in respect of any other example.

That which is claimed is:

1. A method comprising:
   receiving, by a processor and from a sensor, one or more signals indicating a location and a force of an interaction with a surface;
   determining, by the processor, that the location of the interaction corresponds to an object displayed on a display screen; and
   causing, by the processor, a haptic output device to output haptic effects that are configured to simulate a texture of the object in increasing detail in response to the force increasing or in decreasing detail in response to the force decreasing,
   wherein the haptic effects are generated according to a relationship between (i) a haptic function associated with a haptic effect, and (ii) a mapping function that maps the force to a value.

2. The method of claim 1, further comprising:
   generating a first layer signal configured to cause a first layer of a graphical user interface (GUI) having a plurality of layers to be displayed on the display screen in response to the force being below a force threshold; and generating a second layer signal configured to cause a second layer of the GUI to be displayed on the display screen in response to the force meeting or exceeding the force threshold.

3. The method of claim 2, wherein the force threshold is a first force threshold, and further comprising:
determining whether the force meets or exceeds both the first force threshold and a second force threshold that is greater than the first force threshold; and
in response to determining that the force meets or exceeds both the first force threshold and the second force threshold:
generating a third layer signal configured to cause a third layer of the GUI to be displayed on the display screen, the third layer different from the first layer and the second layer; and
transmitting the third layer signal to the display screen.

4. The method of claim 3, wherein the second layer and the third layer visually represent different views of the object.

5. The method of claim 1, wherein the haptic effect is a first haptic effect, and the relationship further includes a second haptic function associated with a second haptic effect that is different from the first haptic effect.

6. The method of claim 1, further comprising:
in response to the location of the interaction corresponding to the object and the force being below a force threshold, outputting a first haptic effect configured to simulate a first characteristic of a first layer of the object; and
in response to the location of the interaction corresponding to the object and the force meeting or exceeding the force threshold, outputting a second haptic effect configured to simulate a second characteristic of (i) a virtual item positioned beneath a surface of the first layer, or (ii) a second layer positioned beneath the first layer.

7. The method of claim 6, wherein the second characteristic includes a texture of the virtual item positioned beneath the surface of the first layer.

8. The method of claim 6, wherein the second characteristic includes a texture of the second layer positioned beneath the first layer.

9. The method of claim 6, wherein the first characteristic includes a first texture and the second characteristic includes a second texture.

10. The method of claim 6, wherein the force threshold is modified over time based on a usage pattern of a user.

11. The method of claim 1, further comprising causing the haptic output device to output a mixture of a first haptic effect simulating a first layer of the object and a second haptic effect simulating a second layer of the object.

12. The method of claim 11, where in the second layer of the object is positioned underneath the first layer of the object.

13. The method of claim 1, further comprising causing the haptic output device to output a mixture of a first haptic effect simulating a layer of the object and a second haptic effect simulating a virtual item positioned within the object.

14. A non-transitory computer-readable medium comprising program code that is executable by a processor to cause the processor to:
receive, from a sensor, one or more signals indicating a location and a force of an interaction with a surface;
determine that the location of the interaction corresponds to an object displayed on a display screen; and
cause a haptic output device to output haptic effects that are configured to simulate a texture of the object in increasing detail in response to the force increasing or in decreasing detail in response to the force decreasing,
wherein the haptic effects are generated according to a relationship between (i) a haptic function associated with a haptic effect, and (ii) a mapping function that maps the force to a value.

15. The non-transitory computer-readable medium of claim 14, further comprising program code that is executable by the processor to cause the processor to:
generate a first layer signal configured to cause a first layer of a graphical user interface (GUI) having a plurality of layers to be displayed on the display screen in response to the force being below a force threshold; and
generate a second layer signal configured to cause a second layer of the GUI to be displayed on the display screen in response to the force meeting or exceeding the force threshold.

16. The non-transitory computer-readable medium of claim 15, wherein the force threshold is a first force threshold, and further comprising program code that is executable by the processor to cause the processor to:
determine whether the force meets or exceeds both the first force threshold and a second force threshold that is greater than the first force threshold; and
in response to determining that the force meets or exceeds both the first force threshold and the second force threshold:
generate a third layer signal configured to cause a third layer of the GUI to be displayed on the display screen, the third layer different from the first layer and the second layer; and
transmit the third layer signal to the display screen.

17. The non-transitory computer-readable medium of claim 16, wherein the second layer and the third layer visually represent different views of the object.

18. The non-transitory computer-readable medium of claim 14, wherein the haptic effect is a first haptic effect, and the relationship further includes a second haptic function associated with a second haptic effect that is different from the first haptic effect.

19. The non-transitory computer-readable medium of claim 14, further comprising program code that is executable by the processor to cause the processor to:
in response to the location of the interaction corresponding to the object and the force being below a force threshold, output a first haptic signal to the haptic output device to cause the haptic output device to output a first haptic effect, the first haptic effect being configured to simulate a first characteristic of a first layer of the object; and
in response to the location of the interaction corresponding to the object and the force meeting or exceeding the force threshold, output a second haptic signal to the haptic output device to cause the haptic output device to output a second haptic effect, the second haptic effect being configured to simulate a second characteristic of (i) a virtual item positioned beneath a surface of the first layer, or (ii) a second layer positioned beneath the first layer.

20. A system comprising:
a haptic output device configured to receive a haptic signal and output a haptic effect;

a processor communicatively coupled to the haptic output device; and a memory on which program code executable by the processor is stored to cause the processor to:

receive, from a sensor, one or more signals indicating a location and a force of an interaction with a surface;

determine that the location of the interaction corresponds to an object displayed on a display screen and the force meets or exceeds a force threshold; and cause the haptic output device to output haptic effects that are configured to simulate a texture of the object in increasing detail in response to the force increasing or in decreasing detail in response to the force decreasing, wherein the haptic effects are generated based on a relationship between (i) a haptic function associated with a haptic effect, and (ii) a mapping function that maps the force to a value.

21. The system of claim 20, wherein the memory further comprises program code executable by the processor to cause the processor to:

generate a first layer signal configured to cause a first layer of a graphical user interface (GUI) having a plurality of layers to be displayed on the display screen in response to the force being below a force threshold; and generate a second layer signal configured to cause a second layer of the GUI to be displayed on the display screen in response to the force meeting or exceeding the force threshold.

22. The system of claim 21, wherein the force threshold is a first force threshold, and wherein the memory further comprises program code executable by the processor to cause the processor to:

determine whether the force meets or exceeds both the first force threshold and a second force threshold that is greater than the first force threshold; and in response to determining that the force meets or exceeds both the first force threshold and the second force threshold:

generate a third layer signal configured to cause a third layer of the GUI to be displayed on the display screen, the third layer different from the first layer and the second layer; and transmit the third layer signal to the display screen.

23. The system of claim 22, wherein the first layer, second layer, and the third layer visually represent different views of the object.

24. The system of claim 20, wherein the memory further comprising program code that is executable by the processor to cause the processor to:

in response to the location of the interaction corresponding to the object and the force being below a force threshold, output a first haptic signal to the haptic output device to cause the haptic output device to output a first haptic effect, the first haptic effect being configured to simulate a first characteristic of a first layer of the object; and in response to the location of the interaction corresponding to the object and the force meeting or exceeding the force threshold, output a second haptic signal to the haptic output device to cause the haptic output device to output a second haptic effect, the second haptic effect being configured to simulate a second characteristic of (i) a virtual item positioned beneath a surface of the first layer, or (ii) a second layer positioned beneath the first layer.

* * * * *